United States Patent
Kweon et al.

(10) Patent No.: US 9,826,560 B2
(45) Date of Patent: Nov. 21, 2017

(54) APPARATUS AND METHOD FOR PROVIDING SERVICE IN COMMUNICATION NETWORK SUPPORTING MULTIPATH TRANSPORT CONTROL PROTOCOL

(71) Applicant: Samsung Electronics Co., Ltd., Suwon-si, Gyeonggi-do (KR)

(72) Inventors: Ki-Suk Kweon, Suwon-si (KR); Ji-Cheol Lee, Suwon-si (KR); Jin-Sung Lee, Suwon-si (KR); Jung-Shin Park, Seoul (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 14/672,501

(22) Filed: Mar. 30, 2015

(65) Prior Publication Data

US 2015/0282219 A1 Oct. 1, 2015

(30) Foreign Application Priority Data

Mar. 31, 2014 (KR) .................. 10-2014-0037851

(51) Int. Cl.
*H04W 76/02* (2009.01)
*H04L 12/761* (2013.01)
(Continued)

(52) U.S. Cl.
CPC ........... *H04W 76/022* (2013.01); *H04L 45/16* (2013.01); *H04L 45/24* (2013.01); *H04L 45/742* (2013.01);
(Continued)

(58) Field of Classification Search
CPC ............ H04W 76/022; H04W 76/062; H04W 28/08; H04L 45/16; H04L 45/742; H04L 45/24; H04L 61/2007
See application file for complete search history.

(56) References Cited

U.S. PATENT DOCUMENTS

2011/0296006 A1* 12/2011 Krishnaswamy . H04L 29/12952
709/224
2012/0093150 A1 4/2012 Kini
(Continued)

FOREIGN PATENT DOCUMENTS

WO 2013/008054 A1 1/2013

OTHER PUBLICATIONS

Christoph Paasch et al., Exploring Mobile/WiFi Handover with Multipath TCP, Jul. 6, 2012.

*Primary Examiner* — Brian O'Connor
(74) *Attorney, Agent, or Firm* — Jefferson IP Law, LLP

(57) ABSTRACT

A method for providing a service by a transparent internet cache (TIC) server in a communication network supporting a multipath transport control protocol (MPTCP) is provided. The method includes establishing an MPTCP connection with a user equipment (UE) and an original server through a first network, upon receiving a service provision request from the UE, releasing the MPTCP connection established among the TIC server, the UE, and the original server if data related to a service corresponding to the service provision request is cached, and providing the service corresponding to the service provision request to the UE.

40 Claims, 14 Drawing Sheets

(51) Int. Cl.
  *H04W 28/08* (2009.01)
  *H04L 12/707* (2013.01)
  *H04L 29/12* (2006.01)
  *H04L 12/747* (2013.01)
  *H04W 76/06* (2009.01)

(52) U.S. Cl.
  CPC ......... *H04L 61/2007* (2013.01); *H04W 28/08* (2013.01); *H04W 76/062* (2013.01)

(56) References Cited

U.S. PATENT DOCUMENTS

| | | |
|---|---|---|
| 2012/0144062 A1 | 6/2012 | Livet et al. |
| 2013/0077501 A1 | 3/2013 | Krishnaswamy et al. |
| 2013/0194963 A1 | 8/2013 | Hampel |
| 2014/0351447 A1* | 11/2014 | Annamalaisami .. H04L 65/1069 709/227 |

* cited by examiner

APPARATUS AND METHOD FOR PROVIDING SERVICE IN COMMUNICATION NETWORK SUPPORTING MULTIPATH TRANSPORT CONTROL PROTOCOL

CROSS-REFERENCE TO RELATED APPLICATION(S)

This application claims the benefit under 35 U.S.C. §119(a) of a Korean patent application filed on Mar. 31, 2014 in the Korean Intellectual Property Office and assigned Serial number 10-2014-0037851, the entire disclosure of which is hereby incorporated by reference.

TECHNICAL FIELD

The present disclosure relates to an apparatus and method for providing a service in a communication network supporting a multipath transport control protocol (MPTCP). More particularly, the present disclosure relates to an apparatus and method for providing a service based on a transparent internet cache (TIC) operation appropriate for an MPTCP connection in a communication network supporting an MPTCP.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An internet video service becomes general, huge amount of video traffic is processed in an internet protocol (IP) network which a communication operator operates. So, the communication operator consumes a significant cost in order to expand a network for smoothly processing a video traffic even though the communication provider does not make earnings.

Various schemes for decreasing video traffic amount have been proposed. A typical scheme is a transparent internet cache (TIC) scheme. The TIC scheme is a scheme wherein a caching server included in a network of a communication operator caches video contents in the network of the communication operator, and provides the cached video contents to video contents users, e.g., user equipments (UEs) if the UEs request the cached video contents thereby decreasing a cost for an international line and backbone network.

Recently, UEs which support a plurality of radio interfaces such as a 3rd generation (3G) scheme, a wireless fidelity (WiFi) scheme, and the like has increased. Accordingly, the importance of a multipath transport control protocol (MPTCP) that a transport layer may recognize and use a plurality of network links has emerged.

The MPTCP has a benefit of acquiring a traffic engineering effect, and is appropriate for providing reliability to a service that has relatively large user requests such as voice over IP (VoIP), IP television (IPTV) game, and the like. The MPTCP uses a resource pooling scheme in order to merge a plurality of links into one link, thereby, accepting a relatively big burst, and uses a multipath, thereby, rapidly responding to a congestion situation.

Recently, UEs that multi-homing is possible become increased. So, it is expected that a usage of an MPTCP will also increase. Specially, UEs that are recently popular are equipped with an MPTCP function, so the possibility that the MPTCP function will be equipped in a server that 3rd party service providers operate becomes more increased.

However, TIC servers which have been proposed up to now do not provide a solution for normally processing an MPTCP connection. Accordingly, there is a need for an improved method and system for providing service in a communication network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing a service in a communication network supporting multipath transport control protocol (MPTCP).

Another aspect of the present disclosure is to provide an apparatus and method for providing a service based on a transparent internet cache (TIC) operation which is appropriate for an MPTCP connection in a communication network supporting an MPTCP.

Another aspect of the present disclosure is to provide an apparatus and method for distinguishing a transmission control protocol (TCP) connection and an MPTCP connection to provide a service based on a TIC operation which is appropriate for an MPTCP connection in a communication network supporting an MPTCP.

In accordance with an aspect of the present disclosure, a TIC server in a communication network supporting an MPTCP is provided. The TIC server includes a transmitter/receiver configured to establish an MPTCP connection with a user equipment (UE) and an original server through a first network, release the MPTCP connection established among the TIC server, the UE, and the original server if data related to a service corresponding to a service provision request is cached upon receiving the service provision request from the UE, and provide the service corresponding to the service provision request to the UE.

In accordance with another aspect of the present disclosure, a UE in a communication network supporting an MPTCP is provided. The UE includes a transmitter/receiver configured to establish an MPTCP connection with a TIC server and an original server through a first network, wherein the transmitter transmits a service provision request to the TIC server, wherein the transmitter/receiver releases the MPTCP connection established among the UE, the TIC server, and the original server, and wherein the receiver receives the service corresponding to the service provision request from the TIC server.

In accordance with another aspect of the present disclosure, a TIC server in a communication network supporting an MPTCP is provided. The TIC server includes a controller configured to detect that a UE which establishes an MPTCP connection with an original server through a first network, sends a request to generate an additional sub-flow based on an internet protocol (IP) address, allocated from a second network different from the first network, to the original server, detect that the MPTCP connection related to the additional sub-flow is an MPTCP connection which is established between the UE and the original server, and prevent a capture of a message transmitted and received through the additional sub-flow.

In accordance with another aspect of the present disclosure, a UE in a communication network supporting an MPTCP is provided. The UE includes a transmitter/receiver configured to perform a procedure of establishing an additional sub-flow based on an IP address, allocated from a second network different from a first network, with an original server while establishing an MPTCP connection with a TIC server through the first network and a controller configured to detect that a service is received from the TIC server upon detecting a failure of the procedure of establishing the additional sub-flow, wherein the transmitter/receiver notifies the TIC server of the IP address to establish an additional sub-flow with the TIC server.

In accordance with another aspect of the present disclosure, a UE in a communication network supporting an MPTCP is provided. The UE includes a transmitter/receiver configured to establish an additional sub-flow with a second network different from a first network while establishing an MPTCP connection with an original sever through the first network, and receive a service through the MPTCP connection established through the first network, such that data related to the service is not cached in a TIC server connected to the original server and the UE.

In accordance with another aspect of the present disclosure, a method for providing a service by a TIC server in a communication network supporting an MPTCP is provided. The method includes establishing an MPTCP connection with a UE and an original server through a first network, upon receiving a service provision request from the UE, releasing the MPTCP connection which is established among the TIC server, the UE, and the original server if data related to a service corresponding to the service provision request is cached, and providing the service corresponding to the service provision request to the UE.

In accordance with another aspect of the present disclosure, a method for receiving a service by a UE in a communication network supporting an MPTCP is provided. The method includes establishing an MPTCP connection with a TIC server and an original server through a first network, transmitting a service provision request to the TIC server, releasing the MPTCP connection which is established among the UE, the TIC server, and the original server, and receiving the service corresponding to the service provision request from the TIC server.

In accordance with another aspect of the present disclosure, a method for providing a service by a TIC server in a communication network supporting an MPTCP is provided. The method includes detecting that a UE, which establishes an MPTCP connection with an original server through a first network, sends a request to generate an additional sub-flow based on an IP address which is allocated by a second network different from the first network to the original server, detecting that the MPTCP connection related to the additional sub-flow, which the UE requests to generate, is an MPTCP connection which is established between the UE and the original server, and preventing a capture of a message which is transmitted and received through the additional sub-flow.

In accordance with another aspect of the present disclosure, a method for receiving a service by a UE in a communication network supporting an MPTCP is provided. The method includes attempting to perform a procedure of establishing an additional sub-flow based on an IP address allocated from a second network different from a first network with an original server while establishing an MPTCP connection with a TIC server through the first network, upon detecting a failure of the procedure of establishing the additional sub-flow, detecting that a service is received from the TIC server, and notifying the TIC server of the IP address allocated from the second network to establish an additional sub-flow with the TIC server.

In accordance with another aspect of the present disclosure, a method for receiving a service by a UE in a communication network supporting an MPTCP is provided. The method includes establishing an additional sub-flow with a second network different from a first network while establishing an MPTCP connection with an original sever through the first network and receiving a service through the MPTCP connection established through the first network, such that data related to the service is not cached in a TIC server connected with the original server and the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
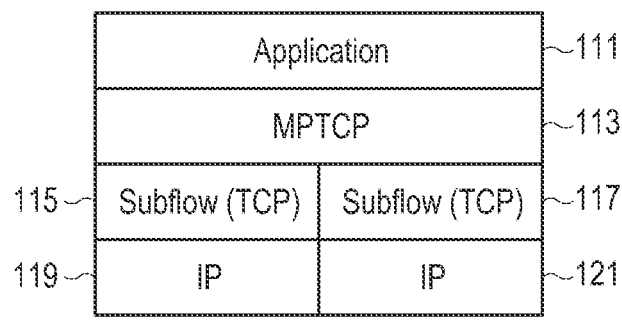
FIG. 1 schematically illustrates a protocol stack structure of a communication network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television (TV), a digital video disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) may be an electronic device.

An embodiment of the present disclosure proposes an apparatus and method for providing a service in a communication network supporting a multipath transport control protocol (MPTCP).

An embodiment of the present disclosure proposes an apparatus and method for providing a service based on a transparent internet cache (TIC) operation in a communication network supporting an MPTCP.

An embodiment of the present disclosure proposes an apparatus and method for distinguishing a transmission control protocol (TCP) connection and an MPTCP connection to provide a service based on a TIC operation which is appropriate for an MPTCP connection in a communication network supporting an MPTCP.

A method and apparatus proposed in various embodiments of the present disclosure may be applied to various mobile communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a CDMA mobile communication system proposed in the 3GPP2, an institute of electrical and electronics engineers (IEEE) 802.16m communication system, an evolved packet system (EPS), a mobile internes protocol (Mobile IP) system, and/or the like.

A protocol stack structure of a communication network according to an embodiment of the present disclosure will be described with reference to FIG. 1.

FIG. 1 schematically illustrates a protocol stack structure of a communication network according to an embodiment of the present disclosure.

Referring to FIG. 1, the protocol stack includes an application layer 111, an MPTCP layer 113, a sub-flow layers (TCP layers), i.e., a sub-flow layer 115 and a sub-flow layer 117, and IP layers, i.e., an IP layer 119 and an IP layer 121.

As described in FIG. 1, the MPTCP layer 113 is located among the application layer 111 and IP layers 119, 121, and acts as a typical TCP layer for the application layer 111 and the IP layers 119, 121. Further, an MPTCP connection includes a plurality of sub-flows 115, 117, and each of the plurality of sub-flows 115, 117 is the same as a typical TCP session.

In a typical TCP, for one process (e.g., an application program), data is transmitted and received through one TCP session between a source node and a destination node. On the other hand, in an MPTCP, data for one application is transmitted and received through a plurality of TCP sessions between the source node and the destination node, and this increases reliability and efficiency of a data communication.

A protocol stack structure of a communication network according to an embodiment of the present disclosure has been described with reference to FIG. 1, and an example of an operating process of a TIC server in a communication network according to an embodiment of the present disclosure will be described with reference to FIG. 2.

Figure 2:
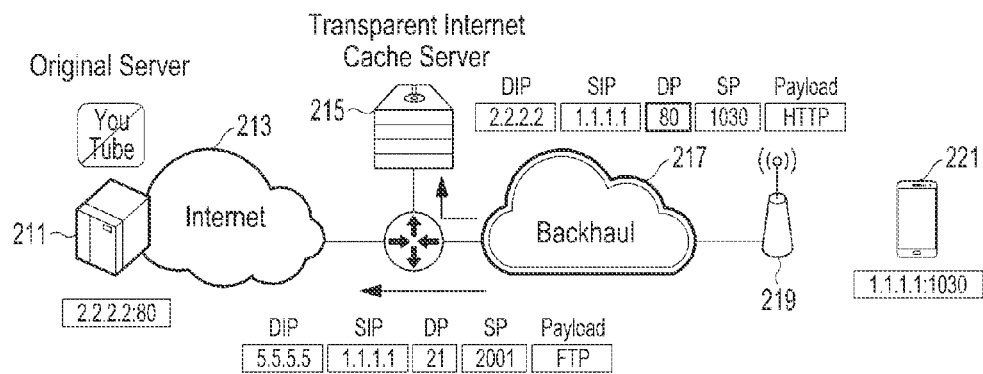
FIG. 2 schematically illustrates an example of an operating process of a transparent internet cache (TIC) server in a communication network according to an embodiment of the present disclosure.

FIG. 2 schematically illustrates an example of an operating process of a TIC server in a communication network according to an embodiment of the present disclosure.

Referring to FIG. 2, the communication network includes an original server 211, an internet 213, a TIC server 215, a backhaul 217, a base station (BS) 219, and a UE 221.

An IP address of the original server 211 is 2.2.2.2, and a port number of the original server 211 is 80. For example, the original server 211 may be a YouTube© server. An IP address of the UE 221 is 1.1.1.1, and a port number of the UE 221 is 1030. In FIG. 2, a DIP denotes a destination IP address (DIP), an SIP denotes a source IP address (SIP), a DP denotes a destination port number (DP), and an SP denotes a source port number (SP).

The TIC server 215 is used for caching hyper text transfer protocol (HTTP) based video streaming data. In FIG. 2, the UE 221 transmits an HTTP message, e.g., an HTTP GET message for requesting to transmit video streaming to the original server 211. Here, a DP of the HTTP GET message is 80. The TIC server 215 determines whether a cache hit occurs for contents which are required by the UE 221 by capturing only a packet of which a DP is 80. Packets of which a DP is not 80, i.e., other type of packets, e.g., packets of which a DP is 21, are bypassed by the TIC server 215.

An example of an operating process of a TIC server in a communication network according to an embodiment of the present disclosure has been described with reference to FIG. 2, and another example of an operating process of a TIC server in a communication network according to an embodiment of the present disclosure will be described with reference to FIG. 3.

Figure 3:
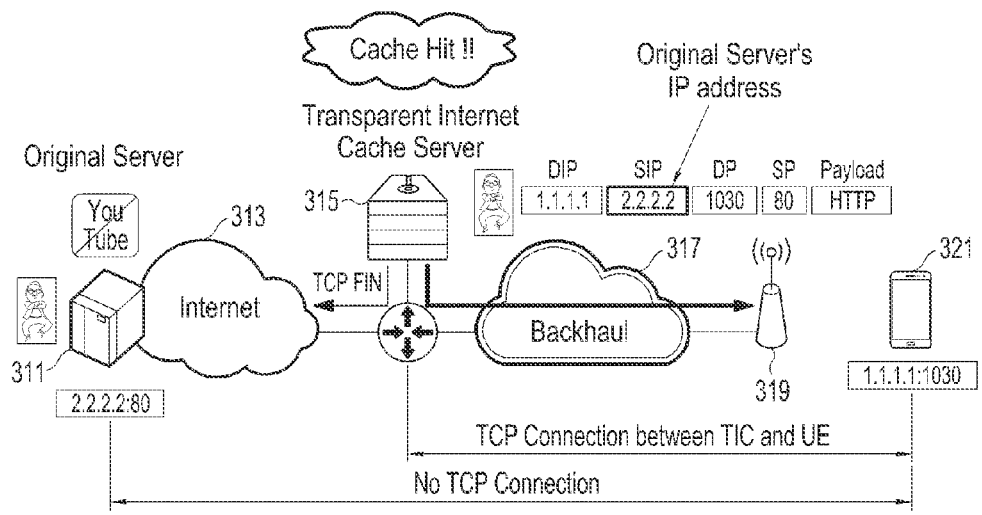
FIG. 3 schematically illustrates another example of an operating process of a TIC server in a communication network according to an embodiment of the present disclosure.

FIG. 3 schematically illustrates another example of an operating process of a TIC server in a communication network according to an embodiment of the present disclosure.

Referring to FIG. 3, the communication network includes an original server 311, an internet 313, a TIC server 315, a backhaul 317, a BS 319, and a UE 321.

An IP address of the original server 311 is 2.2.2.2, and a port number of the original server 311 is 80. For example, the original server 311 may be a YouTube© server. An IP address of the UE 321 is 1.1.1.1, and a port number of the UE 321 is 1030.

The TIC server 315 is used for caching HTTP based video streaming data. In FIG. 3, the UE 321 transmits an HTTP message, e.g., an HTTP GET message, for requesting to transmit video streaming to the original server 311. Here, a DP of the HTTP GET message is 80. The TIC server 315 determines whether a cache hit occurs for contents which are required by the UE 321 by capturing only a packet of which a DP is 80. Packets of which a DP is not 80, i.e., other type of packets, e.g., packets of which a DP is 21, are bypassed by the TIC server 315.

If a cache hit occurs, according to an embodiment of the present disclosure, the contents that are required by the UE 321 have been already cached in the TIC server 315. The TIC server 315 transmits a TCP FIN message to the original server 311 to release a TCP session connection which is established between the UE 321 and the original server 311. Here, the TIC server 315 transmits a packet an IP address of the UE 321 is set to an SIP, to the original server 311, so that the original server 311 recognizes that the TCP session is released by the UE 321.

The TIC server 315 provides the contents that are required by the UE 321 to the UE 321 instead of the original server 311. Since the TIC server 315 uses the IP address of the original server 311 as the SIP, the UE 321 recognizes that a video streaming service is received from the original server 311.

Due to such characteristics, the TIC server 315 has characteristics which are transparent to the original server 311 and the UE 321.

An example of an operating process of a TIC server in a communication network according to an embodiment of the present disclosure has been described with reference to FIG. 3. An operating process for an MPTCP in a communication network according to an embodiment of the present disclosure will be described with reference to FIG. 4.

Figure 4:
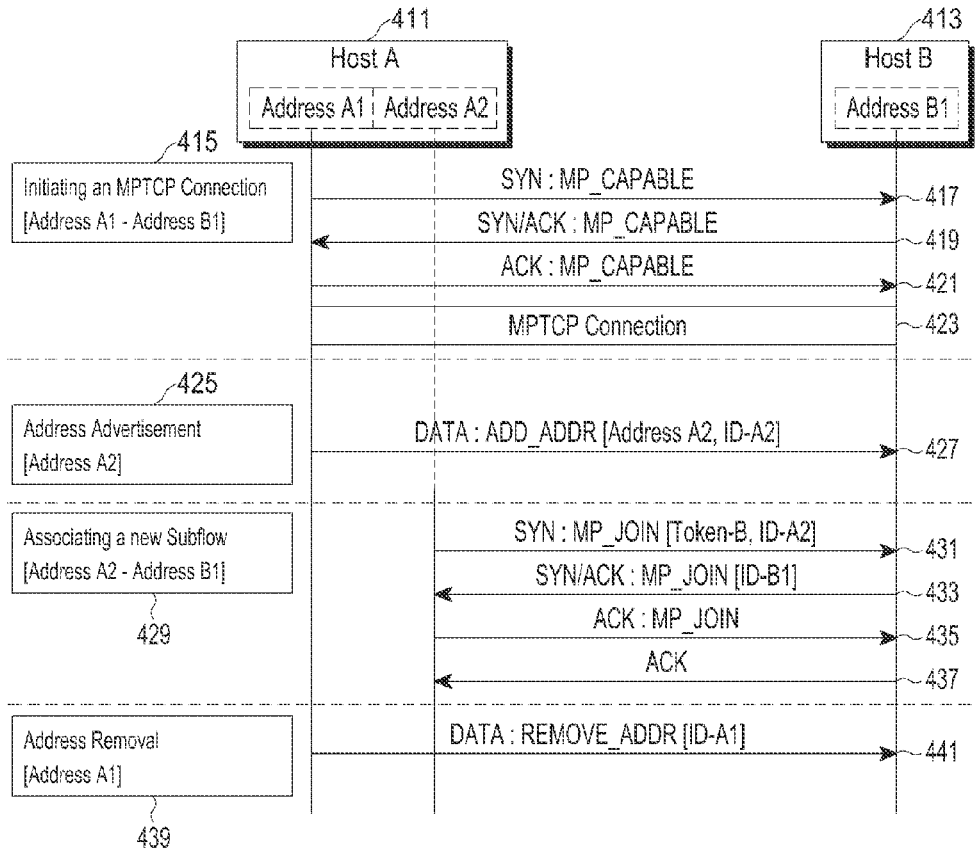
FIG. 4 schematically illustrates an operating process for a multipath transport control protocol (MPTCP) in a communication network according to an embodiment of the present disclosure.

FIG. 4 schematically illustrates an operating process for an MPTCP in a communication network according to an embodiment of the present disclosure.

Referring to FIG. 4, the communication network includes a host A 411 and a host B 413.

The operating process for the MPTCP includes an MPTCP connection initiation procedure 415, an address advertisement procedure 425, a new sub-flow association procedure 429, and an address remove procedure 439.

Firstly, it will be assumed that the host A 411 uses two IP addresses A1 and A2, and the host B 413 uses one IP address, B1.

The host A 411 establishes an MPTCP connection with the host B 413 using an IP address A1. A procedure that the host A 411 uses to establish the MPTCP connection with the host B 413 is the MPTCP connection initiation procedure 415. The MPTCP connection initiation procedure 415 will be described below.

The host A 411 transmits an MP_CAPABLE message (SYN: MP_CAPABLE) to the host B 413 at operation 417. After receiving the MP_CAPABLE message from the host A 411, the host B 413 transmits an MP_CAPABLE message (SYN/ACK: MP_CAPABLE) to the host A 411 at operation 419. After receiving the MP_CAPABLE message from the host B 413, the host A 411 transmits an MP_CAPABLE message (ACK: MP_CAPABLE) to the host B 413 at operation 421.

An MPTCP connection is established between the host A 411 and the host B 413 at operation 423.

The host A 411 may generate the second sub-flow using an IP address A2, and inform the host B 413 only of the presence of the IP address A2. If the host A 411 does not generate the second sub-flow and informs the host B 413 of a new IP address, the host A 411 informs the host B 413 of the IP address A2 using an ADD_ADDR message (DATA: ADD_ADDR [Address A2, ID-A2]) at operation 427. Here, the address advertisement procedure 425 includes an operation of transmitting the ADD_ADDR message at operation 427.

Meanwhile, the host A 411 may generate a sub-flow using the IP address A2. In this case, the host A 411 transmits an MP_JOIN message (SYN: MP_JOIN [Token-B, ID-A2]) to the host B 413 at operation 431. Here, the Token-B denotes in a token identifier (ID) of an MPTCP connection that a generated sub-flow will be added. After receiving the MP_JOIN message from the host A 411, the host B 413 transmits an MP_JOIN message (SYN/ACK: MP_JOIN [ID-B1]) to the host A 411 at operation 433. After receiving the MP_JOIN message from the host B 413, the host A 411 transmits an MP_JOIN message (ACK: MP_JOIN) to the host B 413 at operation 435. After receiving the MP_JOIN message from the host A 411, the host B 413 transmits an ACK packet to the host A 411 at operation 437. Here, the new sub-flow association procedure 429 includes operations 431 to 437.

If the host A 411 does not use the IP address A1 anymore, the host A 411 needs to inform the host B 413 of this. At this time, the host A 411 uses a REMOVE_ADDR message. Accordingly, the host A 411 informs the host B 413 that the IP address A1 is not available anymore using the REMOVE_ADDR message, and transmits the related sub-flow (DATA: REMOVE_ADDR [ID-A1]) at operation 441. Here, the address remove procedure 439 includes the operation of transmitting the REMOVE_ADDR message at operation 441.

Although FIG. 4 illustrates an operating process for an MPTCP in a communication network according to an embodiment of the present disclosure, various changes could be made to FIG. 4. For example, although shown as a series of operations, various operations in FIG. 4 could overlap, occur in parallel, occur in a different order, or occur multiple times.

Recently, UEs that a multi-homing is possible become increased. So, it is expected that a usage of an MPTCP will be more increased. Specially, UEs which are recently popular equip with an MPTCP function, so a possibility that the MPTCP function will be equipped in a server which 3rd party service providers operate becomes more increased.

As set forth above, TIC servers that have been proposed do not provide a detailed solution for an MPTCP connection. The MPTCP connection may be processed like a typical TCP connection in terms of a TIC server which has no MPTCP function.

When processing an MPTCP connection like a typical TCP connection, a TIC server may not use all gains which are obtained by using the MPTCP connection. This will be described with reference to FIGS. 5 and 6.

If an MPTCP and a TIC server are used together in a communication network, the following situations may occur.

The first situation that may occur is if an MPTCP connection is established through a cellular network. This situation will be described with reference to FIG. 5.

Figure 5:
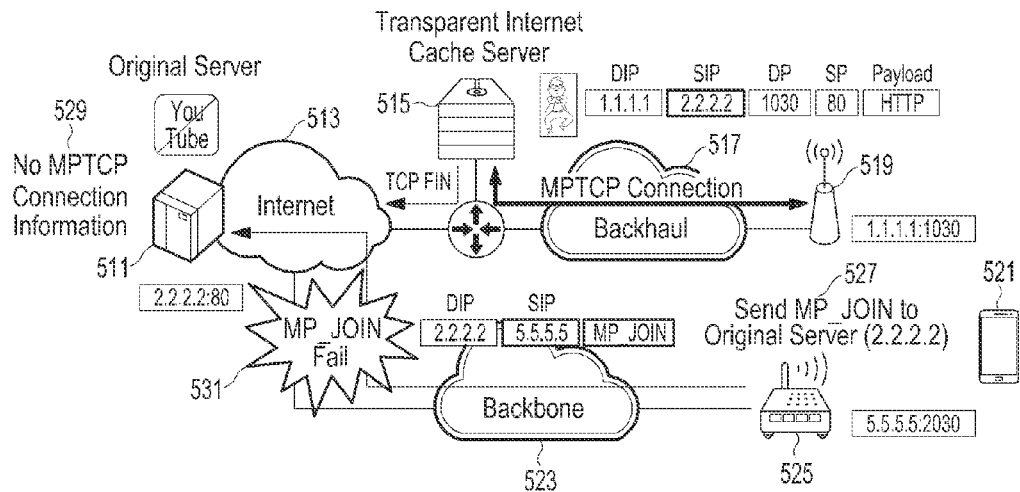
FIG. 5 schematically illustrates an example of a situation that may occur in a case that an MPTCP and a TIC server are used together in a communication network according to an embodiment of the present disclosure.

FIG. 5 schematically illustrates an example of a situation that may occur when an MPTCP and a TIC server are used together in a communication network.

Referring to FIG. 5, the communication network includes an original server 511, an internet 513, a TIC server 515, a backhaul 517, a BS 519, a UE 521, a backbone 523, and a WiFi access point (AP) 525.

An IP address of the original server 511 is 2.2.2.2, and a port number of the original server 511 is 80. For example, the original server 511 may be a YouTube© server. An IP address which is allocated from a cellular network to the UE 521 is 1.1.1.1, and a port number of the UE 521 is 1030. Further, an IP address which is allocated from a WiFi network to the UE 521 is 5.5.5.5, and a port number of the UE 521 is 2030.

As illustrated in FIG. 5, the UE 521 establishes an MPTCP connection with the original server 511 using the IP address 1.1.1.1 which is allocated from the cellular network, and requests a video streaming service using an HTTP GET message. Since a DP of the HTTP GET message is 80, the HTTP GET message is captured by the TIC server 515. If a cache hit is detected, the TIC server 515 will transmit a TCP FIN message to the original server 511 to release the MPTCP connection between the UE 521 and the original server 511 like a typical TCP connection.

The TIC server 515 will provide the video streaming service to the UE 521 using the IP address 2.2.2.2 of the original server 511 instead of the original server 511. Accordingly, the UE 521 will still recognize that the UE 521 establishes the MPTCP connection with the original server 511 and receives the video streaming service from the original server 511 not the TIC server 515.

In this case, if the UE 521 moves into a hot spot region, an IP address is allocated from the WiFi AP 525 to the UE 521. Since the UE 521 recognizes that the UE 521 establishes the MPTCP connection with the original server 511, the UE 521 will try to perform an MP_JOIN operation to the original server 511 using the IP address 5.5.5.5, which has been newly allocated from the WiFi AP 525, in order to generate an additional sub-flow at operation 527.

However, the MPTCP connection with the UE 521 has been released by the TIC server 515. Therefore, the original server 511 has no information about the MPTCP connection with the UE 521 at operation 529.

Accordingly, the MP_JOIN operation will be failed. Finally, a typical TIC server 515 as described in reference to FIG. 5 may not perform a normal MPTCP operation at operation 531.

Meanwhile, the second situation which may occur if an MPTCP and a TIC server are used together in a communication network may occur if an MPTCP connection is established through a heterogeneous network, e.g., a WiFi network, and this will be described with reference to FIG. 6.

Figure 6:
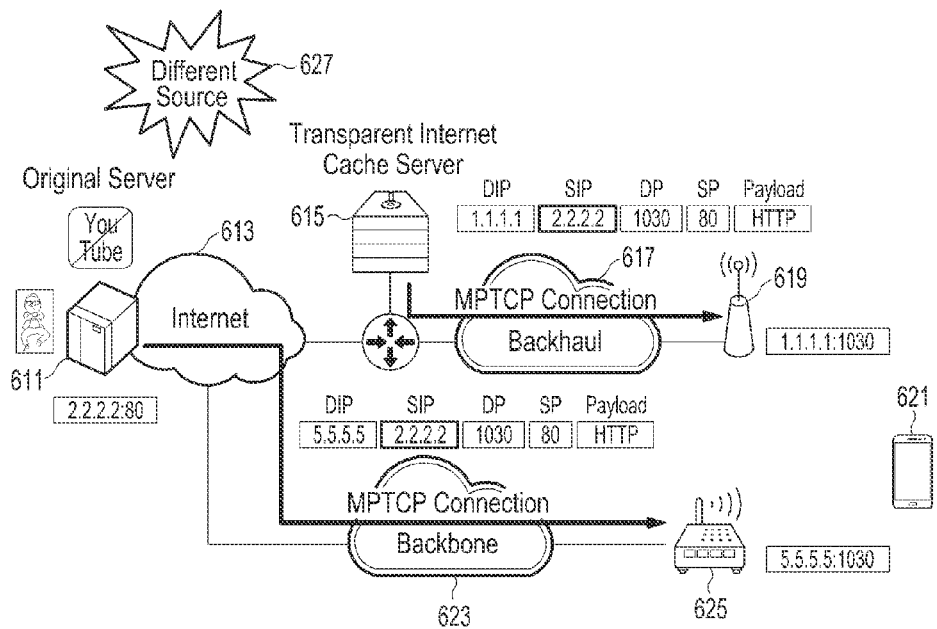
FIG. 6 schematically illustrates another example of a situation that may occur in a case that an MPTCP and a TIC server are used together in a communication network according to an embodiment of the present disclosure.

FIG. 6 schematically illustrates another example of a situation that may occur in a case that an MPTCP and a TIC server are used together in a communication network.

Referring to FIG. 6, the communication network includes an original server 611, an internet 613, a TIC server 615, a backhaul 617, a BS 619, a UE 621, a backbone 623, and a WiFi AP 625.

An IP address of the original server 611 is 2.2.2.2, and a port number of the original server 611 is 80. For example, the original server 611 may be a YouTube© server. An IP address which is allocated from a cellular network to the UE 621 is 1.1.1.1, and a port number of the UE 621 is 1030. Further, an IP address which is allocated from a WiFi network to the UE 621 is 5.5.5.5, and a port number of the UE 621 is 1030.

The TIC server 615 is deployed at a mobile network, so an MPTCP connection which is established through a heterogeneous network, i.e., a WiFi network, is not passed through the TIC server 615.

As illustrated in FIG. 6, the UE 621 establishes an MPTCP connection with the original server 611 using the IP address 5.5.5.5, which is allocated from the WiFi AP 625, and receives a video streaming service from the original server 611. In this case, the UE 621 establishes an additional sub-flow using the IP address 1.1.1.1, which is allocated from the cellular network. An MP_JOIN message is successfully transmitted from the UE 621 to the original server 611, and the additional sub-flow is generated.

The UE 621 may transmit an HTTP GET message through any sub-flow in order to receive video streaming data. If the HTTP GET message is transmitted to the original server 611 through a cellular network, the TIC server 615 may capture the HTTP GET message.

If the TIC server 615 detects a cache hit, the TIC server 615 will release the sub-flow between the UE 621 and the original server 611 which is generated through the cellular network. In this case, the UE 621 receives the video streaming service from two different sources, i.e., the original server 611 and the TIC server 615 at operation 627.

Those having skill in the art recognize that one MPTCP connection from two different sources does not operates normally, and, therefore, an MPTCP operation is also not normally performed.

In order to solve situations which may occur in a communication network in the case that an MPTCP and a TIC server are used together as described in FIGS. 5 and 6, an embodiment of the present disclosure discloses two schemes, a TIC server based scheme and a UE based scheme.

An operating process for an MPTCP of a TIC server based scheme in a communication network according to an embodiment of the present disclosure will be described with reference to FIGS. 7A to 10.

An example of an operating process for an MPTCP of a TIC server based scheme in a communication network according to an embodiment of the present disclosure will be described with reference to FIGS. 7A and 7B.

Figure 7A:
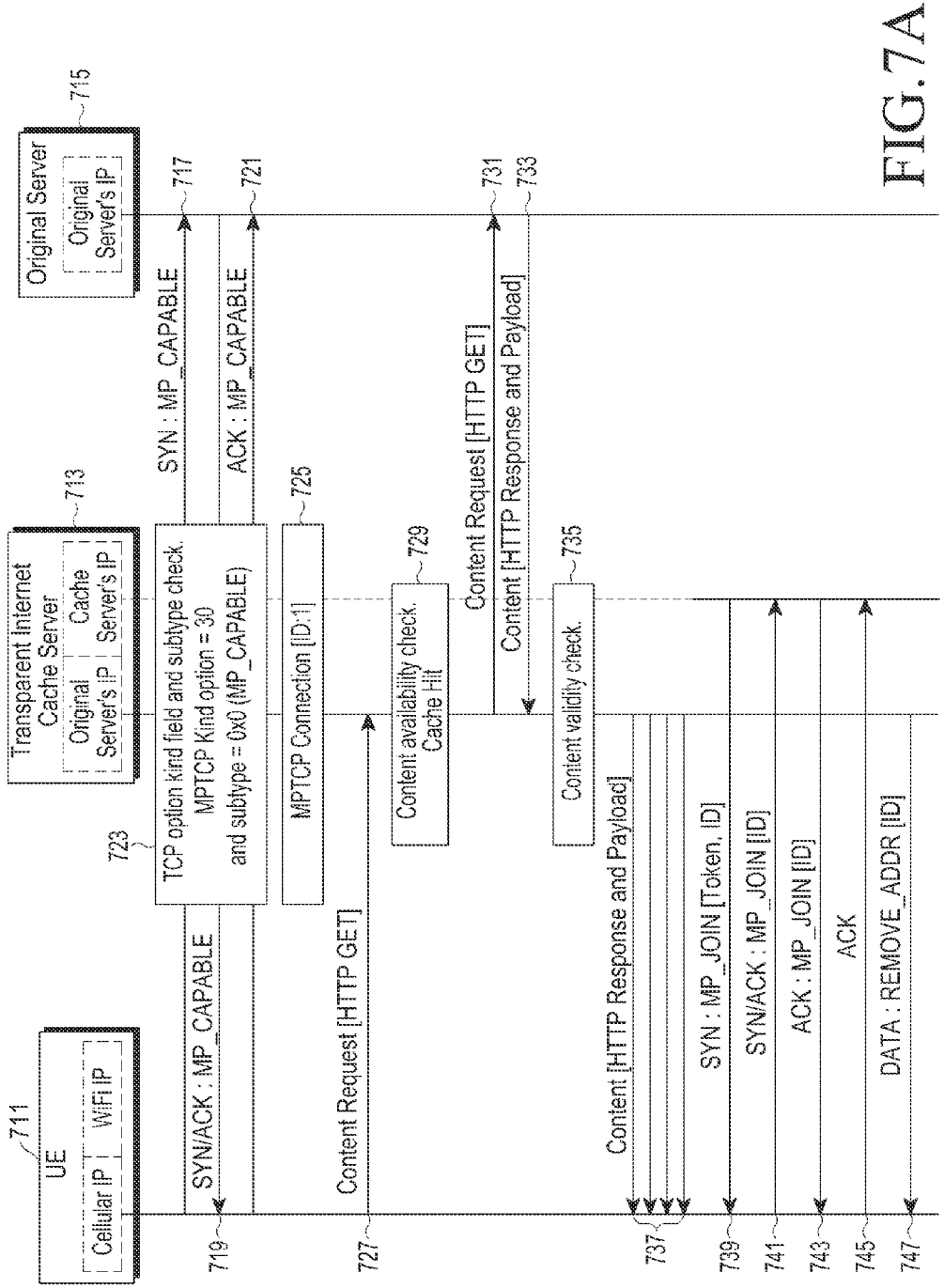
FIGS. 7A and 7B schematically illustrate an example of an operating process for an MPTCP of a TIC server based scheme in a communication network according to an embodiment of the present disclosure.
Figure 7B:
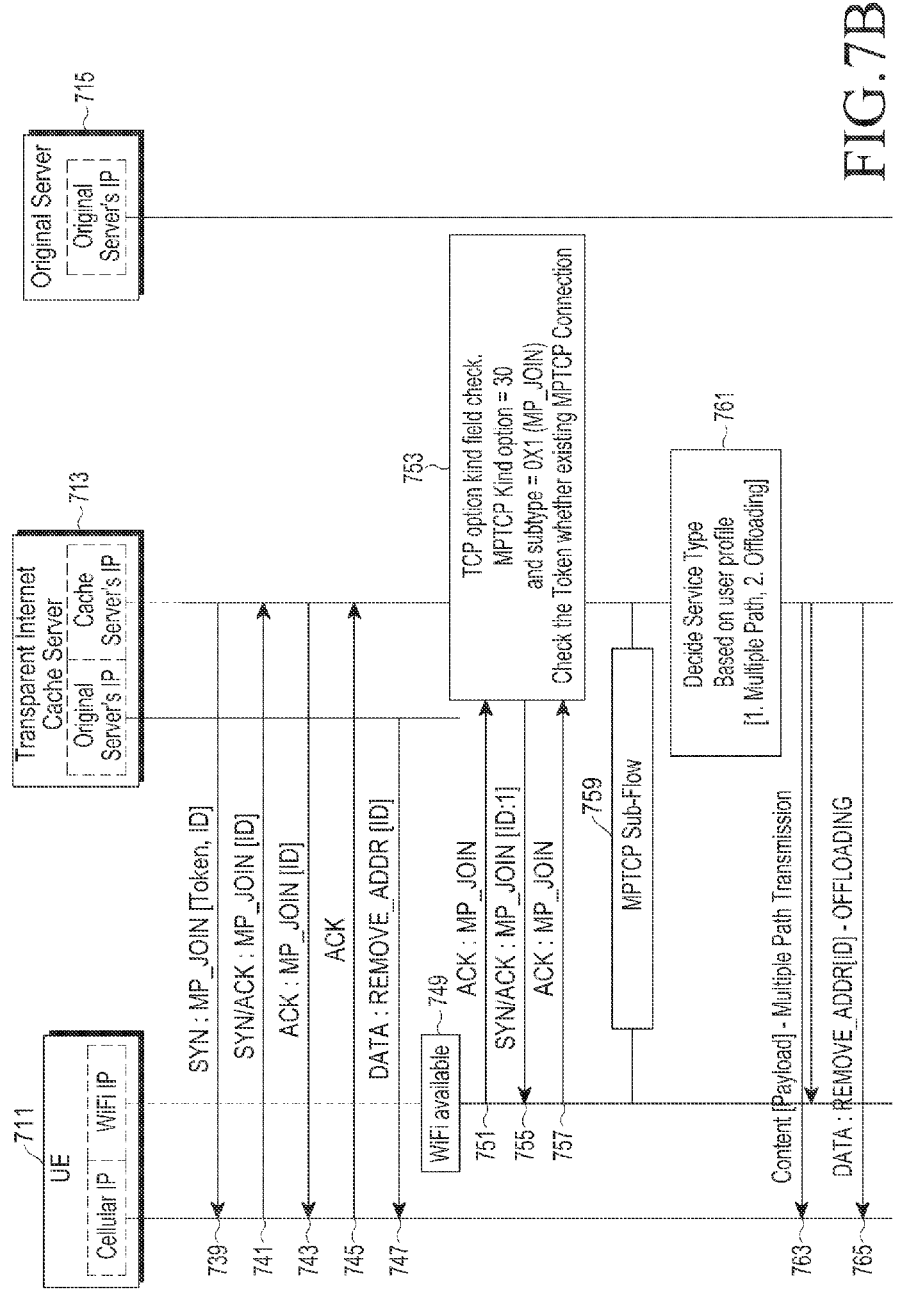

FIGS. 7A and 7B schematically illustrate an example of an operating process for an MPTCP of a TIC server based scheme in a communication network according to an embodiment of the present disclosure.

Referring to FIGS. 7A and 7B, the communication network includes a UE 711, a TIC server 713, and an original server 715.

The UE 711 uses a cellular IP address and a WiFi IP address, the TIC server 713 uses an IP address of the original server 715 and an IP address of the TIC server 713, and the original server 715 uses the IP address of the original server 715.

It will be noted that an example of an operating process for an MPTCP of a TIC server based scheme in a communication network according to an embodiment of the present disclosure in FIGS. 7A and 7B is an example of an operating process for an MPTCP of a TIC server based scheme in a communication network according to an embodiment of the present disclosure in a case that an MPTCP connection is established through a cellular network.

If the MPTCP connection is established through the cellular network, in the operating process of the TIC server based scheme, the TIC server 713 may include a module for detecting an MPTCP connection, a source IP address migration module for changing an IP address of the TIC server 713, and a module for determining whether to provide a multi-path service according to subscription data of the UE 711.

The UE 711 establishes an MPTCP connection with the original server 715 is described below.

The UE 711 transmits an MP_CAPABLE message (SYN: MP_CAPABLE) to the original server 715 at operation 717. After receiving the MP_CAPABLE message from the UE 711, the original server 715 transmits an MP_CAPABLE message (SYN/ACK: MP_CAPABLE) to the UE 711 at operation 719. After receiving the MP_CAPABLE message from the original server 715, the UE 711 transmits an MP_CAPABLE (ACK: MP_CAPABLE) message to the original server 715 at operation 721. In this case, the TIC server 713 may detect whether a connection between the UE 711 and the original server 715 is an MPTCP connection using a kind option field and a subtype field of a TCP option field at operation 723.

A format of an MPTCP packet in a communication network according to an embodiment of the present disclosure will be described with reference to FIG. 8.

Figure 8:
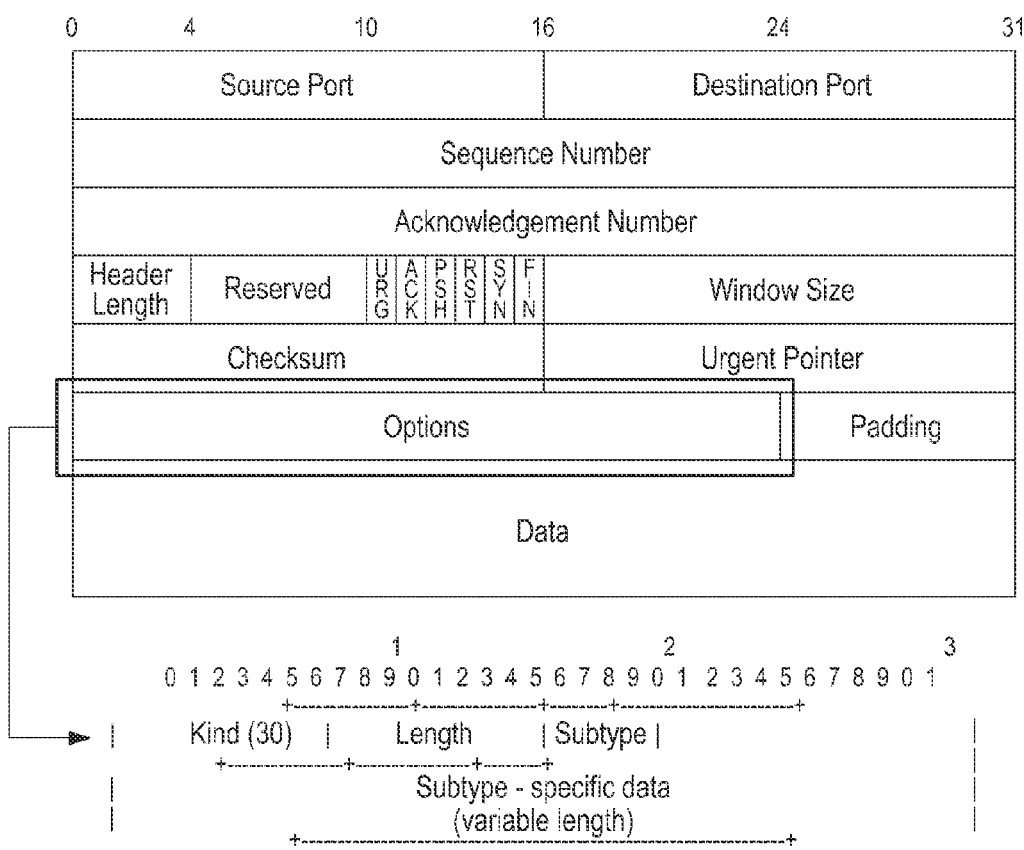
FIG. 8 schematically illustrates a format of an MPTCP packet in a communication network according to an embodiment of the present disclosure.

FIG. 8 schematically illustrates a format of an MPTCP packet in a communication network according to an embodiment of the present disclosure.

Referring to FIG. 8, the MPTCP packet includes a source port field, a destination port field, a sequence number field, an acknowledgement number field, a header length field, a reserved field, an URG field, an ACK field, a PSH field, a reset (RST) field, a SYN field, a FIN field, a window size field, a checksum field, an urgent pointer field, an options field, a padding field, and a data field.

The options field includes a kind field, a length field, a subtype field, and a subtype-specific data field. The subtype-specific data field supports a variable length.

For an MPTCP packet, a field value of the kind field of the options field is set to "30", and if an MPTCP connection is established, a field value of the subtype field is set to "MP_CAPABLE".

Referring back to FIGS. 7A and 7B, after the MPTCP connection is established among the UE 711, the TIC server 713, and the original server 715 at operation 725, the UE 711 transmits an HTTP GET message (Content Request [HTTP GET]) to the original server 715 in order to request a video streaming transmission at operation 727. After the UE 711 transmits the HTTP GET message, the TIC server 713 determines whether a cache hit occurs by capturing the HTTP GET message at operation 729.

After detecting that the cache hit occurs, the TIC server 713 transmits a TCP FIN message to the original server 715 to release the MPTCP connection which is established between the UE 711 and the original server 715 (not shown in FIGS. 7A and 7B). The video streaming service that is being requested by the UE 711 is provided by the TIC server 713 not the original server 715.

The TIC server 713 then sends a request to transmit video streaming to the original server 715. In this case, the TIC server 713 transmits a content request to request the video streaming using an HTTP GET message (Content Request [HTTP GET]) at operation 731. After receiving the HTTP GET message from the TIC server 713, the original server 715 provides a video streaming service to the TIC server 713. That is, the original server 715 provides a content to the TIC server 713 using an HTTP Response and Payload message (Content [HTTP Response and Payload]) at operation 733.

After receiving the HTTP Response and Payload message from the original server 715, the TIC server 713 determines whether the content provided from the original server 715 is available at operation 735. If the content provided from the original server 715 is available, the TIC server 713 provides the content to the UE 711 using an HTTP Response and Payload message (Content [HTTP Response and Payload]) at operation 737.

Operations 731 to 737 determine whether a cache hit occurs. Accordingly, even though a cache hit occurs for a file name, a content validity check operation may be performed for checking that two files for which the cache hit occurs are the same at operation 729. If it is detected that cached data is the same as data which is requested by the UE 711 according to the content validity check operation, the TIC server 713 transmits a TCP FIN message to the original server 715 to release the MPTCP connection which is established between the UE 711 and the original server 715, and transmits the cached data to the UE 711. Therefore, the TIC server 713 may transmit the data to the UE 711 even though the TIC server 713 does not receive the data from the original server 715. Finally, the TCP FIN message is transmitted to the original server 715 after operation 735.

The TIC server 713 provides a service using the IP address of the original server 715 in order to transparently operate for the UE 711. However, since the UE 711 transmits an MP_JOIN message using the IP address of the original server 715, there is a need to change an IP address used for providing the service to the IP address of the TIC server 713.

Accordingly, an embodiment of the present disclosure proposes a source IP address migration scheme.

The source IP address migration scheme uses an MP_JOIN operation and a REMOVE_ADDR operation which are supported in an MPTCP. The TIC server 713 establishes an additional sub-flow with the UE 711 based on the IP address of the TIC server 713 using an MP_JOIN message, and removes a sub-flow which is established based on the IP address of the original server 715 using a REMOVE_ADDR message. With this operation, the TIC server 713 may provide a video streaming service by changing an IP address from the IP address of the original server 715 to the IP address of the TIC server 713. This will be described below.

The TIC server 713 transmits an MP_JOIN message (SYN: MP_JOIN [Token, ID]) to the UE 711 at operation 739. After receiving the MP_JOIN message from the TIC server 713, the UE 711 transmits an MP_JOIN message (SYN/ACK: MP_JOIN [ID]) to the TIC server 713 at operation 741. After receiving the MP_JOIN message from the UE 711, the TIC server 713 transmits an MP_JOIN message (ACK: MP_JOIN [ID]) to the UE 711 at operation 743. After receiving the MP_JOIN message from the TIC server 713, the UE 711 transmits an ACK message to the TIC server 713 at operation 745. After receiving the ACK message from the UE 711, the TIC server 713 transmits a REMOVE_ADDR message (DATA: REMOVE_ADDR [ID]) to the UE 711 at operation 747.

After the UE 711 moves into a WiFi hot spot, a new IP address is allocated from a WiFi AP (not shown in FIGS. 7A and 7B) to the UE 711 at operation 749, illustrated in FIG. 7B.

The UE 711 establishes an additional sub-flow using the IP address which is newly allocated from the WiFi AP. An MP_JOIN message, at this time, is transmitted using the IP address of the TIC server 713, so the MP_JOIN message is transmitted to the TIC server 713. This will be described below in reference to FIG. 7B.

The UE 711 transmits an MP_JOIN message (ACK: MP_JOIN) to the TIC server 713 at operation 751. After receiving the MP_JOIN message from the UE 711, the TIC server 713 transmits an MP_JOIN message (SYN/ACK: MP_JOIN) to the UE 711 at operation 755. After receiving the MP_JOIN message from TIC server 713, the UE 711 transmits an MP_JOIN message (ACK: MP_JOIN) to the TIC server 713 at operation 757.

Upon receiving the MP_JOIN message from the UE 711, the TIC server 713 may determine whether the received MP_JOIN message is an MPTCP control message using an options field. If the received MP_JOIN message is the MPTCP control message, the TIC server 713 detects a subtype (MP_JOIN) included in the MPTCP packet. The TIC server 713 determines whether a token included in the MP_JOIN message is an ID of an MPTCP connection which exists in the TIC server 713 at operation 753. If there is no MPTCP connection corresponding to the token included in the MP_JOIN message, a sub-flow is added to the MPTCP connection that is generated between the UE 711 and the original server 715. Therefore the TIC server 713 is not involved.

Accordingly, an MPTCP sub-flow is established between the UE 711 and the TIC server 713 at operation 759.

The TIC server 713 determines whether to provide a service to the UE 711 using a multipath, i.e., through the WiFi network and the cellular network or to perform a traffic offloading operation through the WiFi network based on subscription information of the UE 711 at operation 761. The traffic offloading operation denotes an operation of providing a service by distributing traffic quantity such as an operation of transmitting data that will be transmitted through a cellular network or through a WiFi network. In a multipath case, the service may be provided by distributing traffic through all of the cellular network and the WiFi network. For example, for a UE with a high level, e.g., a level which is higher than a preset threshold level, the TIC server 713 provides a service using a multipath, thereby ensuring a high data rate, e.g., a data rate which is higher than a preset data rate and reliability. On the other hand, for a UE with a low level, e.g., a level which is lower than the preset threshold level, the TIC server 713 performs an offloading operation through the WiFi network thereby saving a relatively expensive cellular radio resource.

The TIC server 713 provides a service to the UE 711 based on the determined result at operation 763 and transmits a REMOVE_ADDR message (DATA: REMOVE_ADDR [ID]-OFFLOADING) to the UE 711 at operation 765.

Although FIGS. 7A and 7B illustrate an example of an operating process for an MPTCP of a TIC server based scheme in a communication network according to an embodiment of the present disclosure, various changes could be made to FIGS. 7A and 7B. For example, although shown as a series of operations, various operations in FIGS. 7A and 7B could overlap, occur in parallel, occur in a different order, or occur multiple times.

An example of an operating process for an MPTCP of a TIC server based scheme in a communication network according to an embodiment of the present disclosure has been described with reference to FIGS. 7A and 7B, and another example of an operating process for an MPTCP of a TIC server based scheme in a communication network according to an embodiment of the present disclosure will be described with reference to FIG. 9.

Figure 9:
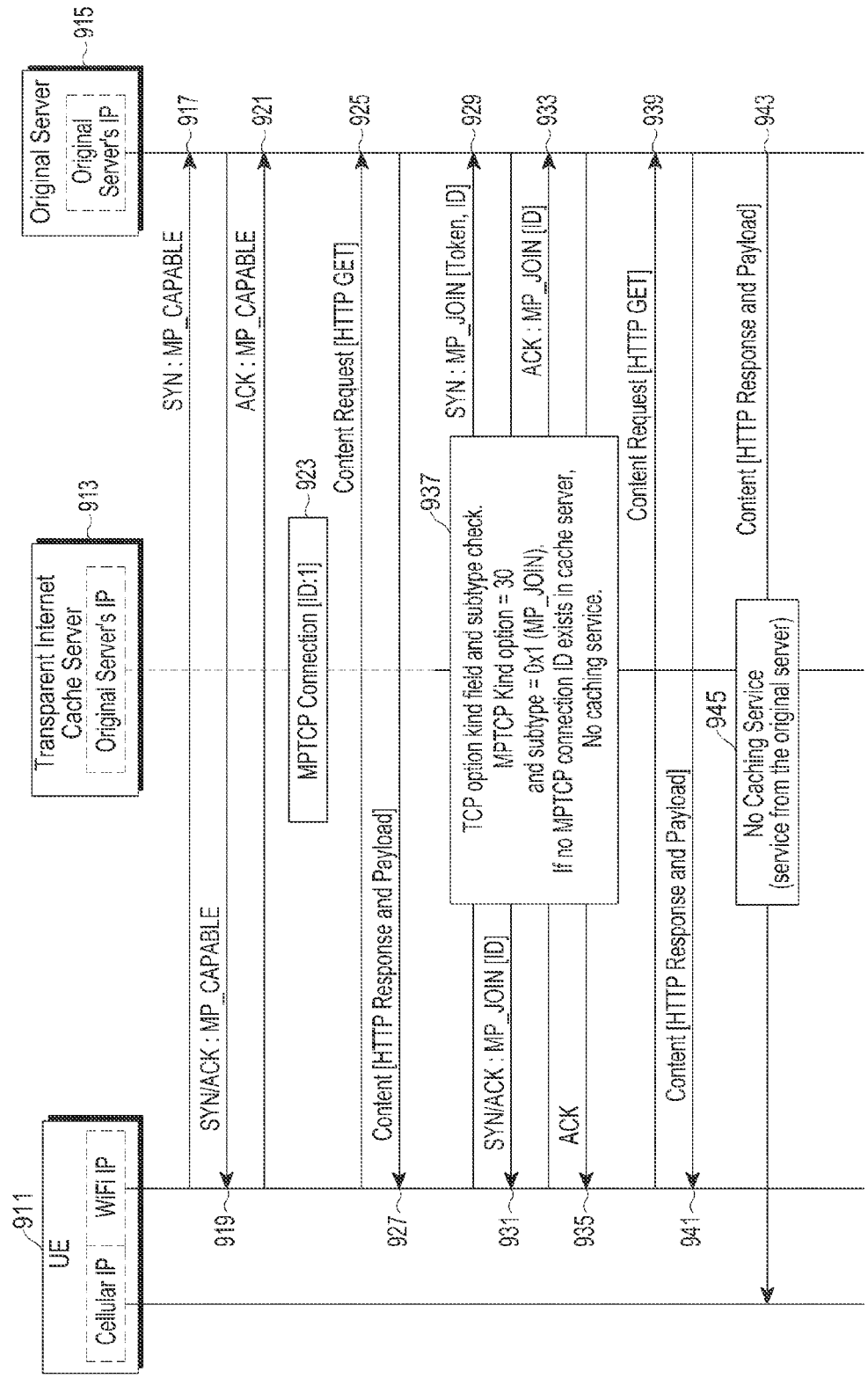
FIG. 9 schematically illustrates another example of an operating process for an MPTCP of a TIC server based scheme in a communication network according to an embodiment of the present disclosure.

FIG. 9 schematically illustrates another example of an operating process for an MPTCP of a TIC server based scheme in a communication network according to an embodiment of the present disclosure.

Referring to FIG. 9, the communication network includes a UE 911, a TIC server 913, and an original server 915.

The UE 911 uses a cellular IP address and a WiFi IP address, the TIC server 913 uses an IP address of the original server 915, and the original server 915 uses the IP address of the original server 915.

FIG. 9 is another example of an operating process for an MPTCP of a TIC server based scheme in a communication network according to an embodiment of the present disclosure in a case that an MPTCP connection is established through a WiFi network.

If the MPTCP connection is established through the WiFi network, in the operating process for the MPTCP of the TIC server based scheme, the TIC server 913 may include a module for detecting an MPTCP connection.

The UE 911 establishes an MPTCP connection with the original server 915 as described below.

The UE 911 transmits an MP_CAPABLE message (SYN: MP_CAPABLE) to the original server 915 at operation 917. After receiving the MP_CAPABLE message from the UE 911, the original server 915 transmits an MP_CAPABLE message (SYN/ACK: MP_CAPABLE) to the UE 911 at operation 919. After receiving the MP_CAPABLE message from the original server 915, the UE 911 transmits an MP_CAPABLE message (ACK: MP_CAPABLE) to the original server 915 at operation 921.

After the MPTCP connection is established between the UE 911 and the original server 915 (MPTCP Connection [ID:1]) at operation 923, the UE 911 transmits an HTTP GET message (Content Request [HTTP GET]) to the original server 915 in order to request to transmit video streaming at operation 925. After receiving the HTTP GET message from the UE 911, the original server 915 provides the content using an HTTP Response and Payload message (Content [HTTP Response and Payload]) at operation 927.

The TIC server 913 is deployed at a mobile network. If an MPTCP connection is established between the UE 911 and the original server 915 through a WiFi network, the TIC server 913 may not detect this MPTCP connection.

After receiving the HTTP Response and Payload message from the original server 915, the UE 911 transmits an MP_JOIN message to the original server 915 using an IP address which is allocated from a cellular network in order to generate an additional sub-flow. The MP_JOIN message is transmitted through the cellular network, so the TIC server 913 may capture the MP_JOIN message. The TIC server 913 may detect that the MP_JOIN message is an MPTCP control message using the module. In this case, the TIC server 913 may detect that a connection between the UE 911 and the original server 915 is an MPTCP connection using a kind option field and a subtype field of a TCP option field. The operation of detecting that the connection between the UE 911 and the original server 915 is the MPTCP connection is performed in the manner described with reference to FIGS. 7A to 8, and a description thereof will be omitted herein.

However, the TIC server 913 may detect that there is no MPTCP connection corresponding to a token included in the MP_JOIN message within the TIC server 913, and detect that the corresponding MPTCP connection is established between the UE 911 and the original server 915 as disclosed below.

The UE 911 transmits an MP_JOIN message (SYN: MP_JOIN [Token, ID]) to the original server 915 at operation 929. After receiving the MP_JOIN message from the UE 911, the original server 915 transmits an MP_JOIN message (SYN/ACK: MP_JOIN [ID]) to the UE 911 at operation 931. After receiving the MP_JOIN message from the original server 915, the UE 911 transmits an MP_JOIN message (ACK: MP_JOIN [ID]) to the original server 915 at operation 933. After receiving the MP_JOIN message from the UE 911, the original server 915 transmits an ACK message to the UE 911 at operation 935.

The MP_JOIN message is transmitted through the cellular network, so the TIC server 913 may capture the MP_JOIN message. The TIC server 913 may detect that the MP_JOIN message is an MPTCP control message using the module. In this case, the TIC server 913 may detect that a connection between the UE 911 and the original server 915 is an MPTCP connection using a kind option field and a subtype field of a TCP option field. However, the TIC server 913 may detect that there is no MPTCP connection corresponding to a token included in the MP_JOIN message within the TIC server 913, and detect that the corresponding MPTCP connection is established between the UE 911 and the original server 915 at operation 937.

Accordingly, the TIC server 913 does not capture an HTTP GET message which the UE transmits for requesting a video streaming service through a related sub-flow as disclosed below.

The UE 911 sends a content request to the original server 915 using an HTTP GET message (Content Request [HTTP GET]) at operation 939. After receiving the HTTP GET message from the UE 911, the original server 915 provides the content to the UE 911 using an HTTP Response and Payload message (Content [HTTP Response and Payload]) at operations 941 and 943. The TIC server 913 does not capture the HTTP GET message which the UE 911 transmits for requesting a video streaming service through a related sub-flow, and does not provide a caching service for the content which the original server provides at operation 945.

Although FIG. 9 illustrates another example of an operating process for an MPTCP of a TIC server based scheme in a communication network according to an embodiment of the present disclosure, various changes could be made to FIG. 9. For example, although shown as a series of operations, various operations in FIG. 9 could overlap, occur in parallel, occur in a different order, or occur multiple times.

Another example of an operating process for an MPTCP of a TIC server based scheme in a communication network according to an embodiment of the present scheme according to an embodiment of the present disclosure has been described with reference to FIG. 9 An operating process of a TIC server in a case where an operating process for an MPTCP of a TIC server based scheme is performed in a communication network according to an embodiment of the present disclosure will be described with reference to FIG. 10.

Figure 10:
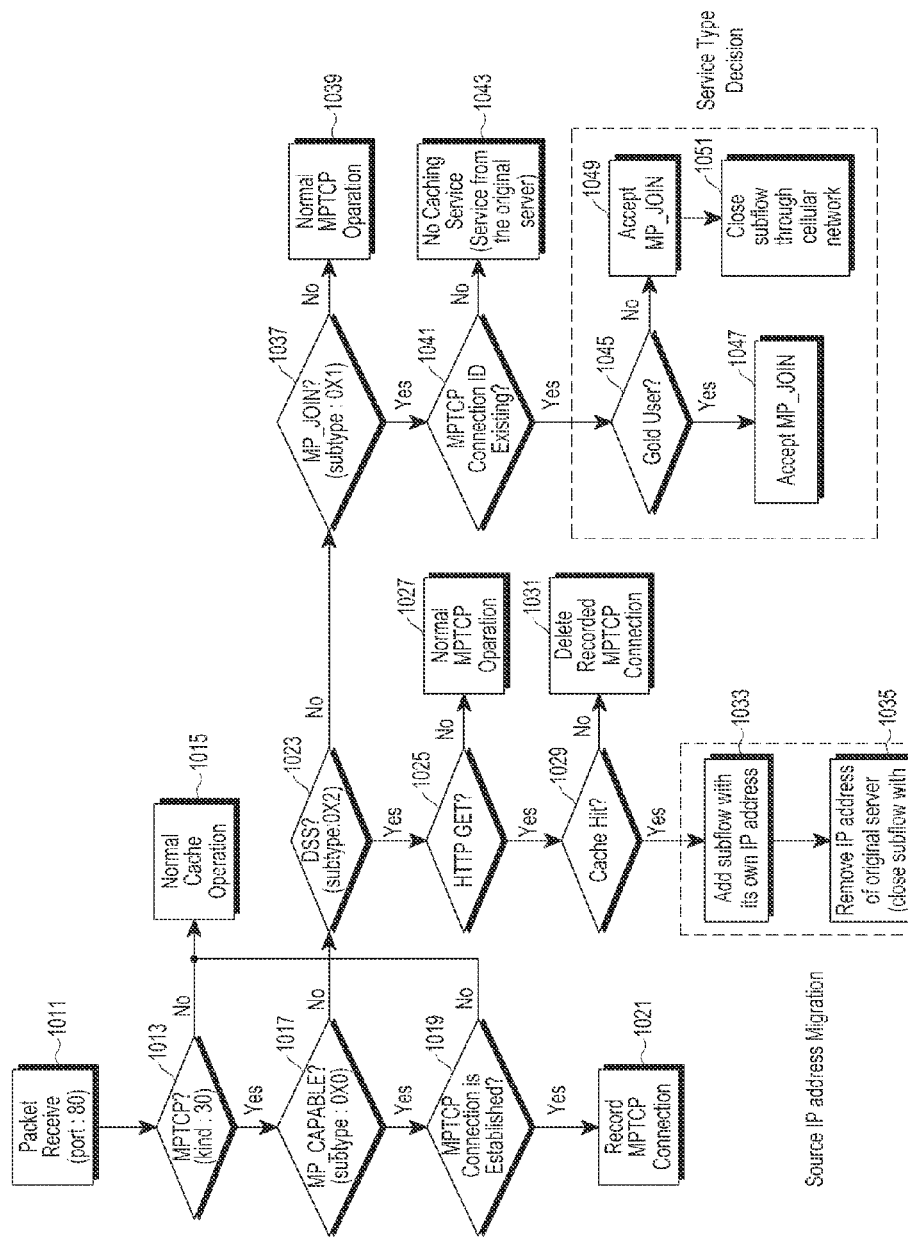
FIG. 10 schematically illustrates an operating process of a TIC server in a case that an operating process for an MPTCP of a TIC server based scheme is performed in a communication network according to an embodiment of the present disclosure.

FIG. 10 schematically illustrates an operating process of a TIC server in a case that an operating process for an MPTCP of a TIC server based scheme is performed in a communication network according to an embodiment of the present disclosure.

Referring to FIG. 10, the TIC server receives a packet with a port number 80 at operation 1011. The TIC server determines whether a field value of a kind field included in the packet is set to "30" in order to determine whether a connection established between an original server and a UE is an MPTCP connection at operation 1013. If the field value of the kind field included in the packet is not set to "30", the TIC server performs a normal cache operation at operation 1015.

If the field value of the kind field included in the packet is set to "30", the TIC server determines whether a field value of a subtype field included in the packet is set to "0x0" at operation 1017. Here, the expression that the field value of the subtype field included in the packet is set to "0x0" has the same meaning as the expression that the field value of the subtype field is set to "MP_CAPABLE". If the field value of the subtype field included in the packet is set to "0x0", the TIC server determines whether an MPTCP connection established between the original server and the UE at operation 1019. If an MPTCP connection is established, the TIC server records contents thereof at operation 1021.

If the field value of the subtype field included in the packet is not set to "0x0", the TIC server determines whether a field value of the subtype field included in the packet is set to "0x2" at operation 1023. Here, the expression that the field value of the subtype field included in the packet is set to "0x2" has the same meaning as the expression that the field value of the subtype field is set to "Data Sequence Signal (DSS)". If the field value of the subtype field included in the packet is set to "0x2", the TIC server determines whether the packet is an HTTP GET packet at operation 1025. If the packet is not the HTTP GET packet, the TIC server performs a normal MPTCP operation at operation 1027.

If the packet is the HTTP GET packet, the TIC server determines whether a cache hit occurs at operation 1029. If the cache hit does not occur, the TIC server removes a record for a related MPTCP connection at operation 1031.

If the cache hit occurs, the TIC server adds a sub-flow with an IP address of the TIC server at operation 1033. The TIC server removes the IP address of the original server at operation 1035. That is, the TIC server releases a sub-flow with the IP address of the original server at operation 1035. Here, operations 1033 and 1035 correspond to a source IP address migration operation.

If the field value of the subtype field included in the packet is not set to "0x2", the TIC server determines whether the field value of the subtype field included in the packet is set to "0x1" at operation 1037. Here, the expression that the field value of the subtype field included in the packet is set to "0x1" has the same meaning as the expression that the field value of the subtype field is set to "MP_JOIN". If the field value of the subtype field included in the packet is not set to "0x1", the TIC server performs a normal MPTCP operation at operation 1039.

If the field value of the subtype field included in the packet is set to "0x1", the TIC server determines whether there is an MPTCP connection ID at operation 1041. If there is no MPTCP connection ID, the TIC server does not provide a caching service at operation 1043.

If there is the MPTCP connection ID, the TIC server determines whether the UE is a gold user at operation 1045. Here, the expression that the UE is a gold user has the same meaning as the expression that a user level, which is determined based on a level as described at operation 761 in FIG. 7B, is a gold user level. In FIG. 10, the gold user denotes a user with the highest level.

If the UE is the gold user, the TIC server accepts an MP_JOIN operation for the UE at operation 1047.

If the UE is not the gold user, the TIC server accepts the MP_JOIN operation for the UE at operation 1049. The TIC server releases a sub-flow through a cellular network at operation 1051. Here, operations 1045 to 1051 correspond to a service type decision operation.

Although FIG. 10 illustrates an operating process of a TIC server in a case where an operating process for an MPTCP of a TIC server based scheme is performed in a communication network according to an embodiment of the present disclosure, various changes could be made to FIG. 10. For example, although shown as a series of operations, various operations in FIG. 10 could overlap, occur in parallel, occur in a different order, or occur multiple times.

An operating process for an MPTCP of a TIC server based scheme as the first scheme for solving situations which may occur in a communication network in a case where an MPTCP and a TIC server are used together as described in FIGS. 5 and 6 has been described with reference to FIGS. 7A to 10. An operating process for an MPTCP of a UE server based scheme as the second scheme for solving situations which may occur in a communication network in a case that an MPTCP and a TIC server are used together as described in FIGS. 5 and 6 will be described with reference to FIGS. 11 to 13.

An example of an operating process for an MPTCP of a UE based scheme in a communication network according to an embodiment of the present disclosure will be described with reference to FIG. 11.

Figure 11:
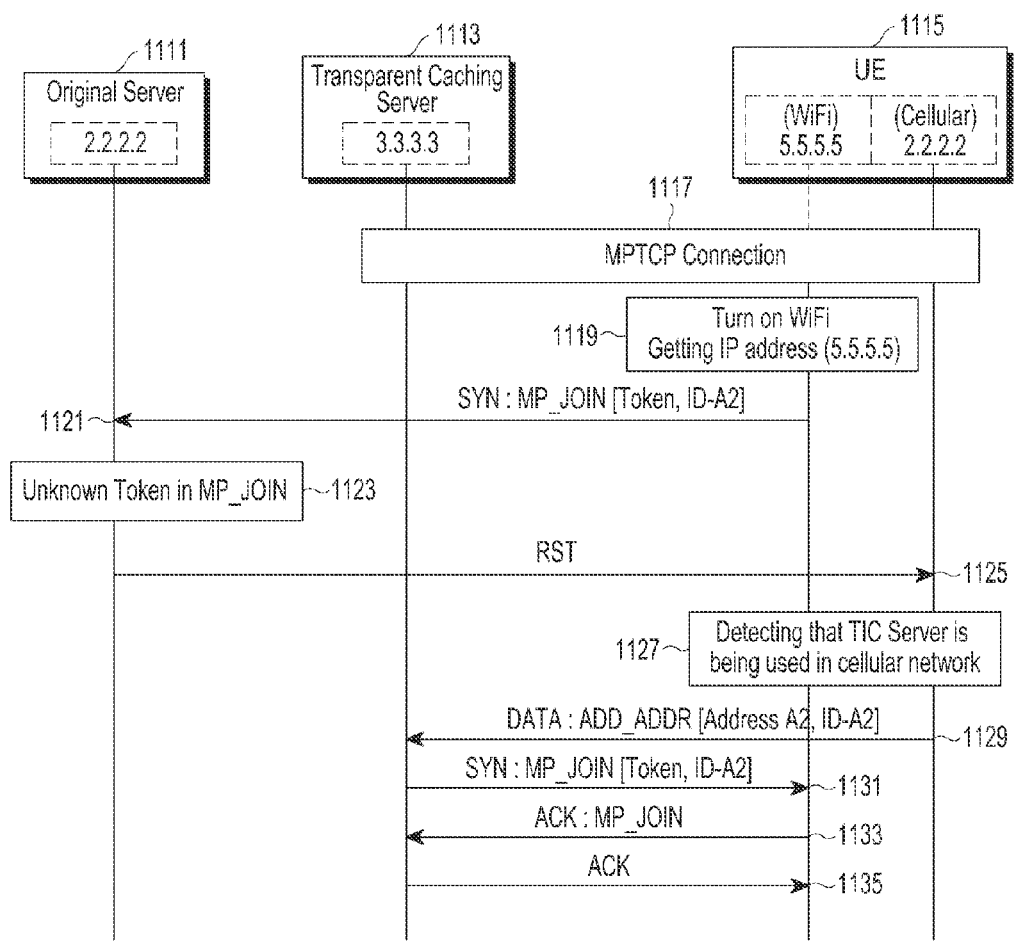
FIG. 11 schematically illustrates an example of an operating process for an MPTCP of a user equipment (UE) based scheme in a communication network according to an embodiment of the present disclosure.

FIG. 11 schematically illustrates an example of an operating process for an MPTCP of a UE based scheme in a communication network according to an embodiment of the present disclosure.

Referring to FIG. 11, the communication network includes an original server 1111, a TIC server 1113, and a UE 1115.

The UE 1115 uses a cellular IP address and a WiFi IP address, the TIC server 1113 uses an IP address of the TIC server 1113, and the original server 1111 uses an IP address of the original server 1111.

It will be noted that an example of an operating process for an MPTCP of a UE based scheme in a communication network according to an embodiment of the present disclosure in FIG. 11 is an example of an operating process for an MPTCP of a UE based scheme in a communication network according to an embodiment of the present disclosure in a case that an MPTCP connection is established through a cellular network.

An MPTCP connection has been established between the TIC server 1113 and the UE 1115 through a cellular network at operation 1117. The TIC server 1113 is transparent for the UE 1115, so the UE 1115 may not recognize that the UE 1115 currently receives a video streaming service from the TIC server 1113 or the original server 1111.

After moving into a WiFi hotspot, the UE 1115 attempts to allocate an IP address from a WiFi AP (not shown in FIG. 11) at operation 1119, and add a new sub-flow.

Accordingly, the UE 1115 transmits an MP_JOIN message (SYN: MP_JOIN [Token, ID-A2]) to the original server 1111 at operation 1121. Meanwhile, the UE 1115 currently receives a service from the TIC server 1113, so the original server 1111 has deleted information about the MPTCP connection established between the UE 1115 and the original server 1111 at operation 1123. As such, upon receiving the MP_JOIN message from the UE 1115, the original server 1111 transmits an RST message to the UE 1115 at operation 1125.

After receiving the RST message from the original server 1111, the UE 1115 may detect that the TIC server 1113 currently provides a video streaming service to the UE 1115 since the UE 1115 received the RST message from the original server 1111 at operation 1127.

The UE 1115, therefore, sends an IP address, which is allocated by the WiFi AP using a sub-flow that has been established through a cellular network, to the TIC server 1113 using an ADD_ADDR message in order to generate an additional sub-flow through the WiFi network (DATA: ADD_ADDR[Address A2, ID-A2]) at operation 1129. After sending the ADD_ADDR message from the UE 1115, the TIC server 1113 detects that the UE ADD_ADDR message, determines that the UE 1115 uses a new IP address as well as an old IP address, and generates the additional sub-flow by performing an MP_JOIN operation, as disclosed below.

After receiving the ADD_ADDR message from the UE 1115, the TIC server 1113 detects that the UE 1115 uses the new IP address as well as the old IP address, and transmits an MP_JOIN message to the UE 1115 (SYN: MP_JOIN [Token, ID-A2]) at operation 1131. After receiving the MP_JOIN message from the TIC server 1113, the UE 1115 transmits an MP_JOIN message to the TIC server 1113 (ACK: MP_JOIN) at operation 1133. After receiving the MP_JOIN message from the UE 1115, the TIC server 1113 transmits an ACK message to the UE 1115 at operation 1135.

Although FIG. 11 illustrates an example of an operating process for an MPTCP of a UE based scheme in a communication network according to an embodiment of the present disclosure, various changes could be made to FIG. 11. For example, although shown as a series of operations, various operations in FIG. 11 could overlap, occur in parallel, occur in a different order, or occur multiple times.

An example of an operating process for an MPTCP of a UE based scheme in a communication network according to an embodiment of the present disclosure has been described with reference to FIG. 11, and another example of an operating process for an MPTCP of a UE based scheme in a communication network according to an embodiment of the present disclosure will be described with reference to FIG. 12.

Figure 12:
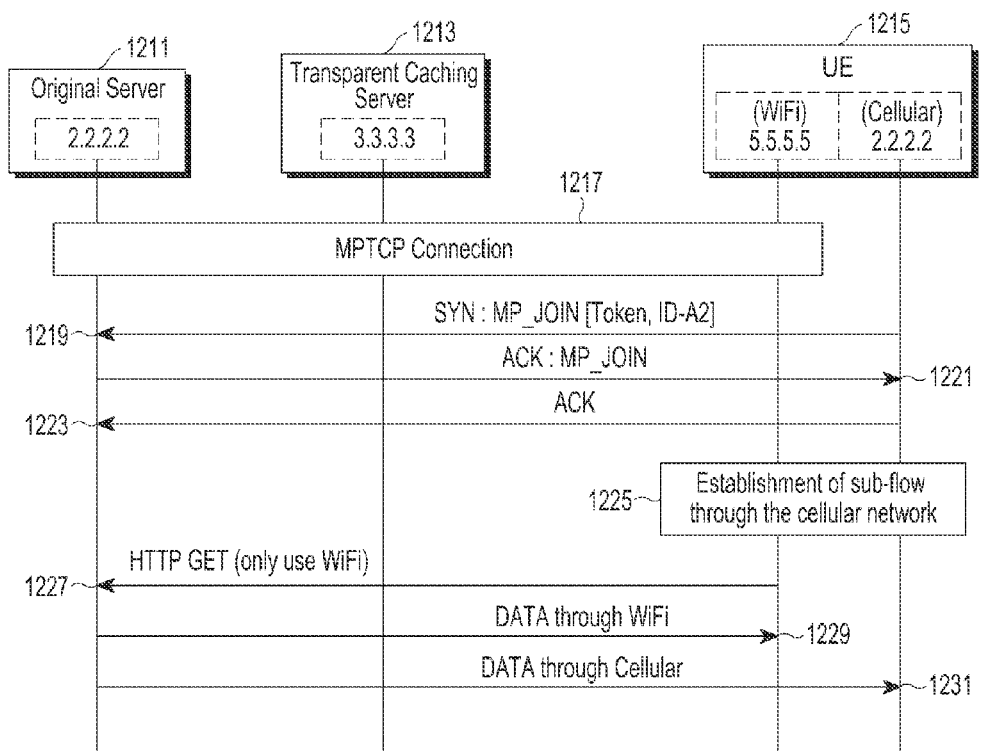
FIG. 12 schematically illustrates another example of an operating process for an MPTCP of a UE based scheme in a communication network according to an embodiment of the present disclosure.

FIG. 12 schematically illustrates another example of an operating process for an MPTCP of a UE based scheme in a communication network according to an embodiment of the present disclosure.

Referring to FIG. 12, the communication network includes an original server 1211, a TIC server 1213, and a UE 1215.

The UE 1215 uses a cellular IP address and a WiFi IP address, the TIC server 1213 uses an IP address of the TIC server 1213, and the original server 1211 uses an IP address of the original server 1211.

It will be noted that another example of an operating process for an MPTCP of a UE based scheme in a communication network according to an embodiment of the present disclosure in FIG. 12 is another example of an operating process for an MPTCP of a UE based scheme in a communication network according to an embodiment of the present disclosure in a case where an MPTCP connection is established through a WiFi network.

An MPTCP connection has been established between the original server 1211 and the UE 1215 through a WiFi network at operation 1217. The UE 1215 may establish an additional sub-flow with the original server 1211 through a cellular network. An operation of establishing the additional sub-flow between the UE 1215 and the original server 1211 through the cellular network will be disclosed below.

The UE 1215 transmits an MP_JOIN message (SYN: MP_JOIN [Token, ID-A2]) to the original server 1211 at operation 1219. After receiving the MP_JOIN message from the UE 1215, the original server 1211 transmits an MP_JOIN message (ACK: MP_JOIN) to the UE 1215 at operation 1221. After receiving the MP_JOIN message from the original server 1211, the UE 1215 transmits an ACK message to the original server 1211 at operation 1223. Using this operation, a sub-flow is established through the cellular network at operation 1225.

After the sub-flow is established through the cellular network, if the TIC server 1213 provides a cache service, there are two sources for the UE 1215. Accordingly, the UE 1215 transmits an HTTP GET message through a sub-flow which is established through a WiFi network, therefore the TIC server 1213 does not detect a cache hit as disclosed below.

The UE 1215 transmits an HTTP GET message to the original server 1211 through a sub-flow which is established through a WiFi network at operation 1227. After receiving the HTTP GET message from the UE 1215, the original server 1211 provides a data service through the WiFi network at operation 1229, and provides the data service through the cellular network at operation 1231.

Although FIG. 12 illustrates another example of an operating process for an MPTCP of a UE based scheme in a communication network according to an embodiment of the present disclosure, various changes could be made to FIG. 12. For example, although shown as a series of operations, various operations in FIG. 12 could overlap, occur in parallel, occur in a different order, or occur multiple times.

Another example of an operating process for an MPTCP of a UE based scheme in a communication network according to an embodiment of the present disclosure has been described with reference to FIG. 12, and an operating process of a UE in a case that an operating process for an MPTCP of a UE based scheme is performed in a communication network according to an embodiment of the present disclosure will be described with reference to FIG. 13.

Figure 13:
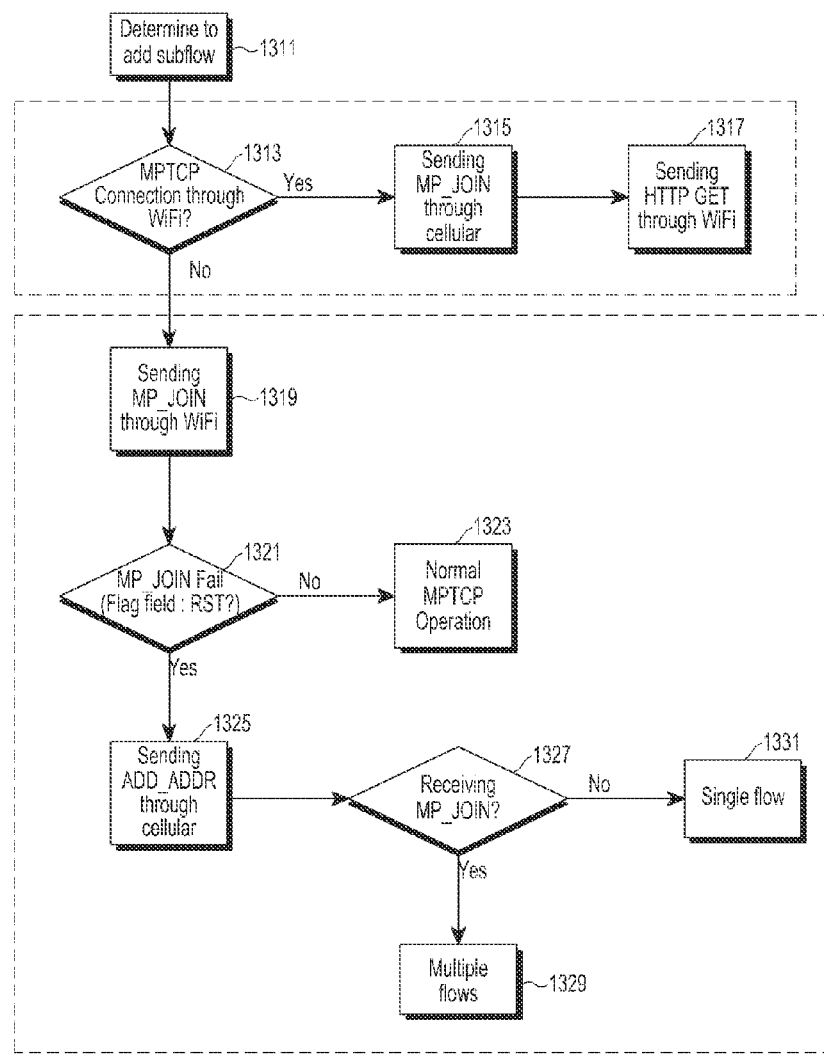
FIG. 13 schematically illustrates an operating process of a UE operating a process for an MPTCP of a UE based scheme is performed in a communication network according to an embodiment of the present disclosure.

FIG. 13 schematically illustrates an operating process of a UE in a case where an operating process for an MPTCP of a UE based scheme is performed in a communication network according to an embodiment of the present disclosure.

Referring to FIG. 13, the UE determines to add a sub-flow at operation 1311. The UE determines whether an old MPTCP connection is an MPTCP connection which is established through a WiFi network at operation 1313. If the old MPTCP connection is the MPTCP connection which is established through the WiFi network, the UE transmits an MP_JOIN message through a cellular network at operation 1315. If the sub-flow which is established through the cellular network is added, the UE transmits an HTTP GET message through the WiFi network at operation 1317. Here, operations 1311 to 1317 correspond to an operating process for an MPTCP of a UE based scheme as described with reference to FIG. 12.

If the old MPTCP connection is not the MPTCP connection which is established through the WiFi network, that is, the old MPTCP connection is an MPTCP connection which is established through the cellular network, the UE transmits an MP_JOIN message through the WiFi network at operation 1319. The UE determines whether an MP_JOIN operation is failed at operation 1321. That is, the UE determines whether an RST message is received at operation 1321. If the MP_JOIN operation is not failed, the UE performs a normal MPTCP operation at operation 1323.

If the MP_JOIN operation is failed, the UE transmits an ADD_ADDR message through the cellular network at operation 1325. The UE determines whether an MP_JOIN message is received at operation 1327. If the MP_JOIN message is received, the UE receives a service through a plurality of flows at operation 1329.

If the MP_JOIN message is not received, the UE receives the service through a single flow at operation 1331.

Although FIG. 13 illustrates an operating process of a UE in a case that an operating process for an MPTCP of a UE based scheme is performed in a communication network according to an embodiment of the present disclosure, various changes could be made to FIG. 13. For example, although shown as a series of operations, various operations in FIG. 13 could overlap, occur in parallel, occur in a different order, or occur multiple times.

An operating process of a UE in a case that an operating process for an MPTCP of a UE based scheme is performed in a communication network according to an embodiment of the present disclosure has been described with reference to FIG. 13, and an inner structure of a UE in a communication network according to an embodiment of the present disclosure will be described with reference to FIG. 14.

Figure 14:
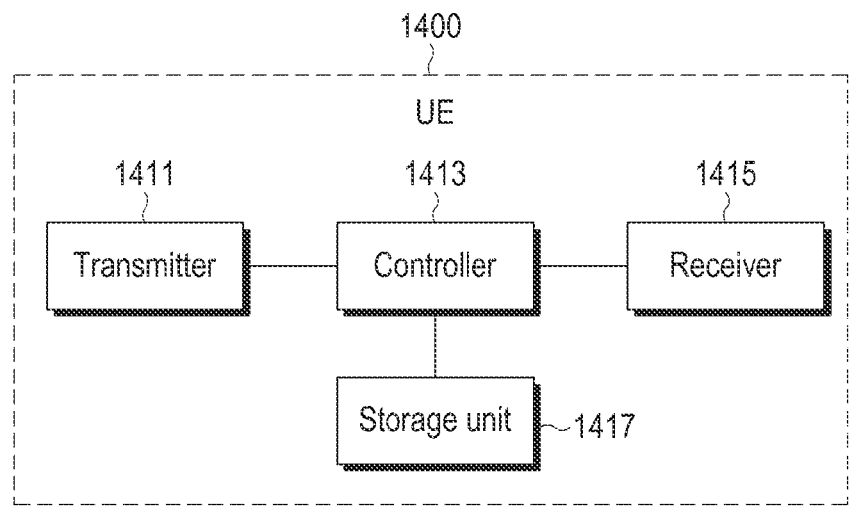
FIG. 14 schematically illustrates an inner structure of a UE in a communication network according to an embodiment of the present disclosure.

FIG. 14 schematically illustrates an inner structure of a UE in a communication network according to an embodiment of the present disclosure.

Referring to FIG. 14, a UE 1400 includes a transmitter 1411, a controller 1413, a receiver 1415, and a storage unit 1417.

The controller 1413 controls the overall operation of the UE 1400. More particularly, the controller 1413 controls the UE 1400 to perform an operation related to an operation of providing an MPTCP connection. The operation related to the operation of providing the MPTCP connection is performed in the manner described with reference to FIGS. 1 to 13, a description thereof is omitted herein.

The transmitter 1411 transmits various signals, various messages, and the like to other entities, e.g., an original server, a TIC server, and the like under the control of the controller 1413. The various signals, the various messages, and the like transmitted in the transmitter 1411 have been described in FIGS. 1 to 13, and a description thereof will be omitted herein.

The receiver 1415 receives various signals, various messages, and the like from other entities, e.g., an original server, a TIC server, and the like under the control of the controller 1413. The various signals, the various messages, and the like received in the receiver 1415 have been described in FIGS. 1 to 13, and a description thereof will be omitted herein.

The storage unit 1417 stores various programs and various data necessary for performing the operation related to the operation of providing the MPTCP connection as described in FIGS. 1 to 13, and various data which occurs while performing the operation related to the operation of providing the MPTCP connection as described in FIGS. 1 to 13.

While the transmitter 1411, the controller 1413, the receiver 1415, and the storage unit 1417 are described as separate units, it is to be understood that this is merely for convenience of description. In other words, two or more of the transmitter 1411, the controller 1413, the receiver 1415, and the storage unit 1417 may be incorporated into a single unit.

An inner structure of a UE in a communication network according to an embodiment of the present disclosure has been described with reference to FIG. 14, and an inner structure of an original server in a communication network according to an embodiment of the present disclosure will be described with reference to FIG. 15.

Figure 15:
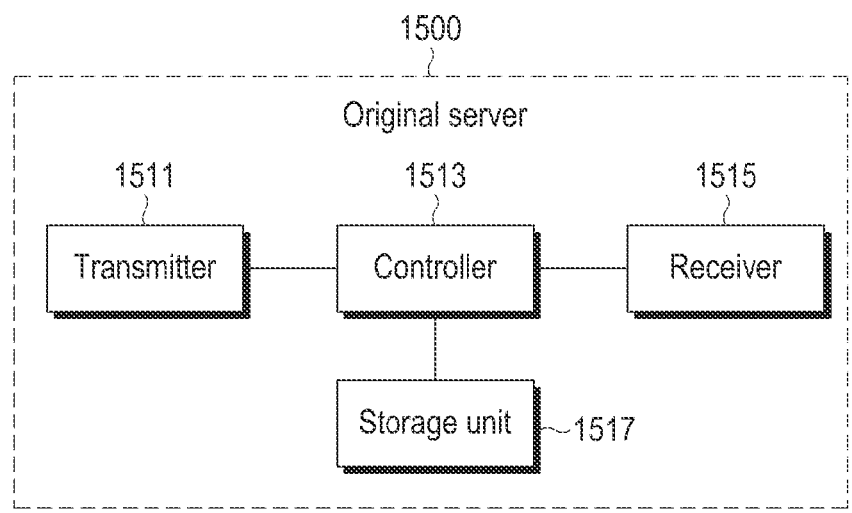
FIG. 15 schematically illustrates an inner structure of an original server in a communication network according to an embodiment of the present disclosure.

FIG. 15 schematically illustrates an inner structure of an original server in a communication network according to an embodiment of the present disclosure.

Referring to FIG. 15, an original server 1500 includes a transmitter 1511, a controller 1513, a receiver 1515, and a storage unit 1517.

The controller 1513 controls the overall operation of the original server 1500. More particularly, the controller 1513 controls the original server 1500 to perform an operation related to an operation of providing an MPTCP connection. The operation related to the operation of providing the MPTCP connection is performed in the manner described with reference to FIGS. 1 to 13, a description thereof is omitted herein.

The transmitter 1511 transmits various signals, various messages, and the like to other entities, e.g., a UE, a TIC server, and the like under a control of the controller 1513. The various signals, the various messages, and the like transmitted in the transmitter 1511 have been described in FIGS. 1 to 13, and a description thereof will be omitted herein.

The receiver 1515 receives various signals, various messages, and the like from other entities, e.g., a UE, a TIC server, and the like under a control of the controller 1513. The various signals, the various messages, and the like received in the receiver 1515 have been described in FIGS. 1 to 13, and a description thereof will be omitted herein.

The storage unit 1517 stores various programs and various data necessary for performing the operation related to the operation of providing the MPTCP connection as described in FIGS. 1 to 13, and various data which occurs while performing the operation related to the operation of providing the MPTCP connection as described in FIGS. 1 to 13.

While the transmitter 1511, the controller 1513, the receiver 1515, and the storage unit 1517 are described as separate units, it is to be understood that this is merely for convenience of description. In other words, two or more of the transmitter 1511, the controller 1513, the receiver 1515, and the storage unit 1517 may be incorporated into a single unit.

An inner structure of an original server in a communication network according to an embodiment of the present disclosure has been described with reference to FIG. 15, and an inner structure of a TIC server in a communication network according to an embodiment of the present disclosure will be described with reference to FIG. 16.

Figure 16:
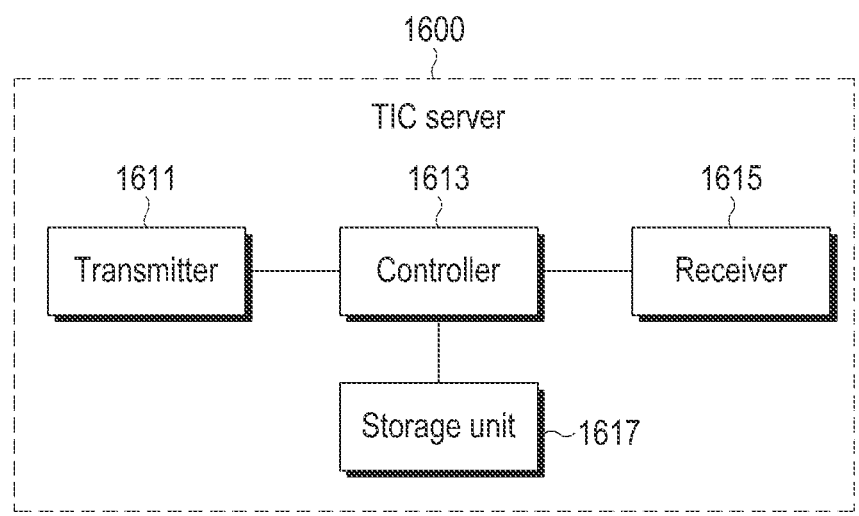
FIG. 16 schematically illustrates an inner structure of a TIC server in a communication network according to an embodiment of the present disclosure.

FIG. 16 schematically illustrates an inner structure of a TIC server in a communication network according to an embodiment of the present disclosure.

Referring to FIG. 16, a TIC server 1600 includes a transmitter 1611, a controller 1613, a receiver 1615, and a storage unit 1617.

The controller 1613 controls the overall operation of the TIC server 1600. More particularly, the controller 1613 controls the TIC server 1600 to perform an operation related to an operation of providing an MPTCP connection. The operation related to the operation of providing the MPTCP connection is performed in the manner described with reference to FIGS. 1 to 13, and a description thereof will be omitted herein.

The transmitter 1611 transmits various signals, various messages, and the like to other entities, e.g., a UE, an original server, and the like under a control of the controller 1613. The various signals, the various messages, and the like transmitted in the transmitter 1611 have been described in FIGS. 1 to 13, and a description thereof will be omitted herein.

The receiver 1615 receives various signals, various messages, and the like from other entities, e.g., a UE, an original server, and the like under a control of the controller 1613. The various signals, the various messages, and the like received in the receiver 1615 have been described in FIGS. 1 to 13, and a description thereof will be omitted herein.

The storage unit 1617 stores various programs and various data necessary for performing the operation related to the operation of providing the MPTCP connection as described in FIGS. 1 to 13, and various data which occurs while performing the operation related to the operation of providing the MPTCP connection as described in FIGS. 1 to 13.

While the transmitter 1611, the controller 1613, the receiver 1615, and the storage unit 1617 are described as separate units, it is to be understood that this is merely for convenience of description. In other words, two or more of the transmitter 1611, the controller 1613, the receiver 1615, and the storage unit 1617 may be incorporated into a single unit.

As is apparent from the foregoing description, an embodiment of the present disclosure enables providing a service based on a TIC operation in a communication network supporting an MPTCP.

An embodiment of the present disclosure enables distinguishing a TCP connection and an MPTCP connection to provide a service based on a TIC operation which is appropriate for an MPTCP connection in a communication network supporting an MPTCP.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc (CD)-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a service by a first server in a communication network supporting a multipath transport control protocol (MPTCP), the method comprising:
   establishing an MPTCP connection with a user equipment (UE) and a second server through a first network;
   upon receiving a service provision request from the UE, releasing the MPTCP connection which is established among the first server, the UE, and the second server if data related to a service corresponding to the service provision request is cached in the first server; and
   providing the service to the UE.

2. The method of claim 1, further comprising:
   establishing a first additional sub-flow with the UE based on an internet protocol (IP) address of the first server, and releasing a sub-flow which is established based on an IP address of the second server, after providing the service to the UE; and
   providing the service to the UE through the first additional sub-flow.

3. The method of claim 2, further comprising:
   establishing a second additional sub-flow through a second network different from the first network;
   determining whether to provide the service through the first network or to perform a traffic offloading operation through the second network; and
   providing the service to the UE based on the determined result.

4. The method of claim 3, wherein the determining of whether to provide the service through the first network or to perform the traffic offloading operation through the second network comprises determining whether to provide the service through the first network or to perform the traffic offloading operation through the second network based on a level of the UE.

5. The method of claim 3, wherein the traffic offloading operation includes an operation of providing the service through the first network and the second network.

6. The method of claim 3, wherein the first network is a cellular network, and the second network is a WiFi network.

7. A method for receiving a service by a user equipment (UE) in a communication network supporting a multipath transport control protocol (MPTCP), the method comprising:
   establishing an MPTCP connection with a first server and a second server through a first network;
   transmitting a service provision request to the first server;
   releasing the MPTCP connection which is established among the UE, the first server, and the second server; and
   receiving the service corresponding to the service provision request from the first server.

8. The method of claim 7, further comprising:
   after receiving the service from the first server, establishing a first additional sub-flow with the first server based on an internet protocol (IP) address of the first server, and removing a sub-flow which is established based on an IP address of the second server; and
   receiving the service from the first server through the first additional sub-flow.

9. The method of claim 8, further comprising:
   establishing a second additional sub-flow through a second network different from the first network; and
   receiving the service from the first server through the first network, or receiving the service based on a traffic offloading operation through the second network.

10. The method of claim 9, wherein the receiving of the service from the first server through the first network, or the receiving of the service based on the traffic offloading operation through the second network comprises receiving the service from the first server through the first network based on a level of the UE, or receiving the service based on the traffic offloading operation through the second network by considering a level of the UE.

11. The method of claim 9, wherein the traffic offloading operation includes an operation of providing the service through the first network and the second network.

12. The method of claim 9, wherein the first network is a cellular network, and the second network is a WiFi network.

13. A method for providing a service by a first server in a communication network supporting a multipath transport control protocol (MPTCP), the method comprising:
   detecting that a user equipment (UE), which establishes an MPTCP connection with a second server through a first network, sends a request to generate an additional sub-flow based on an internet protocol (IP) address which is allocated by a second network different from the first network to the second server;
   detecting that the MPTCP connection related to the additional sub-flow, which the UE requests to generate, is an MPTCP connection which is established between the UE and the second server; and
   preventing a capture of a message which is transmitted and received through the additional sub-flow.

14. The method of claim 13, wherein the detecting of that the MPTCP connection related to the additional sub-flow, which the UE requests to generate, is the MPTCP connection established between the UE and the second server comprises:
   detecting that the MPTCP connection related to the additional sub-flow does not exist within the first server; and
   determining the MPTCP connection related to the additional sub-flow is the MPTCP connection established between the UE and the second server if the MPTCP connection related to the additional sub-flow does not exist within the first server.

15. The method of claim 13, wherein the first network is a WiFi network, and the second network is a cellular network.

16. A method for receiving a service by a user equipment (UE) in a communication network supporting a multipath transport control protocol (MPTCP), the method comprising:
   attempting to perform a procedure of establishing an additional sub-flow based on an internet protocol (IP) address allocated from a second network different from a first network with a second server while establishing an MPTCP connection with a first server through the first network;
   upon detecting a failure of the procedure of establishing the additional sub-flow, detecting that a service is received from the first server; and notifying the first server of the IP address allocated from the second network to establish an additional sub-flow with the first server.

17. The method of claim 16, wherein the detecting of the failure of the procedure of establishing the additional sub-flow comprises detecting a receipt of a reset (RST) message from the second server.

18. The method of claim 16, wherein the first network is a cellular network, and the second network is a WiFi network.

19. A method for receiving a service by a user equipment (UE) in a communication network supporting a multipath transport control protocol (MPTCP), the method comprising:
   establishing an additional sub-flow with a second network different from a first network while establishing an MPTCP connection with a second sever through the first network; and
   receiving a service through the MPTCP connection established through the first network, such that data related to the service is not cached in a first server connected with the second server and the UE.

20. The method of claim 19, wherein the first network is a WiFi network, and the second network is a cellular network.

21. A first server in a communication network supporting a multipath transport control protocol (MPTCP), the first server comprising:
   a transmitter/receiver configured to:
      establish an MPTCP connection with a user equipment (UE) and a second server through a first network,
      release the MPTCP connection established among the first server, the UE, and the second server if data related to a service corresponding to a service provision request is cached in the first server upon receiving the service provision request from the UE, and
      provide the service to the UE.

22. The first server of claim 21, wherein the transmitter/receiver is configured to:
   establish a first additional sub-flow with the UE based on an Internet Protocol (IP) address of the first server,
   release a sub-flow established based on an IP address of the second server after providing the service to the UE, and
   provide the service to the UE through the first additional sub-flow.

23. The first server of claim 22, further comprising:
   a controller,
   wherein the transmitter/receiver is configured to establish a second additional sub-flow through a second network different from the first network,
   wherein the controller is configured to determine whether to provide the service through the first network or to perform a traffic offloading operation through the second network, and
   wherein the transmitter/receiver is configured to provide the service to the UE based on the determined result of the controller.

24. The first server of claim 23, wherein the controller is configured to determine whether to provide the service through the first network or to perform the traffic offloading operation through the second network based on a level of the UE.

25. The first server of claim 23, wherein the traffic offloading operation includes an operation of providing the service through the first network and the second network.

26. The first server of claim 23, wherein the first network is a cellular network, and the second network is a WiFi network.

27. A user equipment (UE) in a communication network supporting a multipath transport control protocol (MPTCP), the UE comprising:
   a transmitter/receiver configured to establish an MPTCP connection with a first server and a second server through a first network,
   wherein the transmitter transmits a service provision request to the first server,
   wherein the transmitter/receiver releases the MPTCP connection established among the UE, the first server, and the second server, and
   wherein the receiver receives the service corresponding to the service provision request from the first server.

28. The UE of claim 27,
   wherein, after the receiver receives the service from the first server, the transmitter/receiver is configured to:
      establish a first additional sub-flow with the first server based on an internet protocol (IP) address of the first server, and
      remove a sub-flow which is established based on an IP address of the second server, and
   wherein the receiver receives the service from the first server through the first additional sub-flow.

29. The UE of claim 28,
   wherein the transmitter/receiver is configured to establish a second additional sub-flow through a second network different from the first network, and
   wherein the receiver receives the service from the first server through the first network, or receives the service based on a traffic offloading operation through the second network.

30. The UE of claim 29, wherein the receiver receives the service from the first server through the first network, or receives the service based on the traffic offloading operation through the second network by considering a level of the UE.

31. The UE of claim 29, wherein the traffic offloading operation includes an operation of providing the service through the first network and the second network.

32. The UE of claim 29, wherein the first network is a cellular network, and the second network is a WiFi network.

33. A first server in a communication network supporting a multipath transport control protocol (MPTCP), the first server comprising:
   a controller configured to:
      detect that a user equipment (UE), which establishes an MPTCP connection with a second server through a first network, sends a request to generate an additional sub-flow based on an internet protocol (IP) address, allocated from a second network different from the first network, to the second server,
      detect that the MPTCP connection related to the additional sub-flow is an MPTCP connection established between the UE and the second server, and
      prevent a capture of a message transmitted and received through the additional sub-flow.

34. The first server of claim 33, wherein the controller is further configured to:
   detect that the MPTCP connection related to the additional sub-flow does not exist within the first server, and
   determine the MPTCP connection related to the additional sub-flow is the MPTCP connection established between the UE and the second server if the MPTCP connection related to the additional sub-flow does not exist within the first server.

35. The first server of claim 33, wherein the first network is a WiFi network, and the second network is a cellular network.

36. A user equipment (UE) in a communication network supporting a multipath transport control protocol (MPTCP), the UE comprising:
   a transmitter/receiver configured to perform a procedure of establishing an additional sub-flow based on an internet protocol (IP) address, allocated from a second network different from a first network, with a second server while establishing an MPTCP connection with a first server through the first network; and
   a controller configured to detect that a service is received from the first server upon detecting a failure of the procedure of establishing the additional sub-flow,
   wherein the transmitter/receiver notifies the first server of the IP address to establish an additional sub-flow with the first server.

37. The UE of claim 36, wherein the controller is configured to detect the failure of the procedure of establishing the additional sub-flow if the receiver receives a reset (RST) message from the second server.

38. The UE of claim 36, wherein the first network is a cellular network, and the second network is a WiFi network.

39. A user equipment (UE) in a communication network supporting a multipath transport control protocol (MPTCP), the UE comprising:
   a transmitter/receiver configured to:
      establish an additional sub-flow with a second network different from a first network while establishing an MPTCP connection with a second sever through the first network, and
      receive a service through the MPTCP connection established through the first network, such that data related to the service is not cached in a first server connected to the second server and the UE.

40. The UE of claim 39, wherein the first network is a WiFi network, and the second network is a cellular network.

* * * * *